US012688485B2

(12) United States Patent
Poker et al.

(10) Patent No.: US 12,688,485 B2
(45) Date of Patent: Jul. 21, 2026

(54) SHELVING STRUCTURE AND VALIDATION APPARATUS FOR IMPROVED IMAGE PROCESSING OF CODES ON STORAGE BINS

(71) Applicant: DeRoyal Industries, Inc., Powell, TN (US)

(72) Inventors: Nicholas J. Poker, Knoxville, TN (US); Dhanvin S. Desai, Knoxville, TN (US); Sallie P. Patrick, Maryville (GB); Joe L. Smith, Powell, TN (US)

(73) Assignee: DeRoyal Industries, Inc., Powell, TN (US)

( * ) Notice: Subject to any disclaimer, the term of this patent is extended or adjusted under 35 U.S.C. 154(b) by 99 days.

(21) Appl. No.: 18/609,394

(22) Filed: Mar. 19, 2024

(65) Prior Publication Data

US 2024/0338653 A1 Oct. 10, 2024

Related U.S. Application Data

(63) Continuation-in-part of application No. 18/414,925, filed on Jan. 17, 2024, which is a continuation-in-part of application No. 18/131,056, filed on Apr. 5, 2023.

(51) Int. Cl.
| | |
|---|---|
| *G06Q 10/087* | (2023.01) |
| *A47F 5/00* | (2006.01) |
| *G06K 7/10* | (2006.01) |
| *G06K 7/14* | (2006.01) |
| *G06K 19/06* | (2006.01) |

(52) U.S. Cl.
CPC ......... *G06Q 10/087* (2013.01); *A47F 5/0043* (2013.01); *G06K 7/10722* (2013.01); *G06K 7/1417* (2013.01); *G06K 19/06037* (2013.01)

(58) Field of Classification Search
CPC ............... G06Q 10/087; A47F 5/0043; G06K 7/10722; G06K 7/1417; G06K 19/06037
See application file for complete search history.

(56) References Cited

U.S. PATENT DOCUMENTS

| | | | | |
|---|---|---|---|---|
| 3,983,822 | A * | 10/1976 | Suttles | ................... A47B 57/42 |
| | | | | 248/224.8 |
| 10,783,491 | B2 | 9/2020 | Buibas et al. | |
| 10,963,658 | B1 | 3/2021 | Bloch et al. | |
| 2005/0234580 | A1 | 10/2005 | Roldan | |

(Continued)

FOREIGN PATENT DOCUMENTS

WO 2021216329 A1 10/2021

OTHER PUBLICATIONS

Kari Rodriquez Authorized Officer, Notice of Transmittal of the International Search Report and Written Opinion (PCT Rule 44.1), ISA/US Alexandria, VirginiaPCT/US24/22944, Date of mailing Aug. 30, 2024.

*Primary Examiner* — Matthew Mikels
(74) *Attorney, Agent, or Firm* — Luedeka Neely, P.C.; Mark P. Crockett

(57) ABSTRACT

In an optical imaging based Kanban inventory replenishment system, a top shelf structure is configured to enhance the visibility of optical codes on empty bins that are placed on the top shelf of a shelving unit, and a validation apparatus placed on top of the top shelf structure is configured for use in validation procedure that confirms a proper installation and alignment of cameras used in capturing images of the optical codes on the empty bins.

15 Claims, 20 Drawing Sheets

(End view of shelving unit)

(56) References Cited

U.S. PATENT DOCUMENTS

| 2017/0255899 | A1 |  | 9/2017 | Taira et al. |
| 2017/0305669 | A1 |  | 10/2017 | Tsai et al. |
| 2018/0060943 | A1 |  | 3/2018 | Mattingly et al. |
| 2018/0144097 | A1 | * | 5/2018 | Moore ................... G06Q 50/22 |
| 2020/0003000 | A1 |  | 1/2020 | Savage et al. |
| 2022/0027841 | A1 |  | 1/2022 | Mitchell et al. |
| 2022/0106122 | A1 |  | 4/2022 | Tie |
| 2022/0172549 | A1 |  | 6/2022 | Chung et al. |
| 2022/0245584 | A1 |  | 8/2022 | Polager et al. |

* cited by examiner (End view of shelving unit)

(Front view of shelving unit)

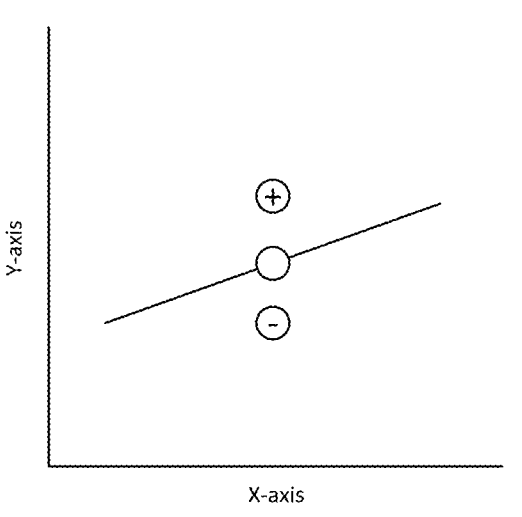
Normal Algebra
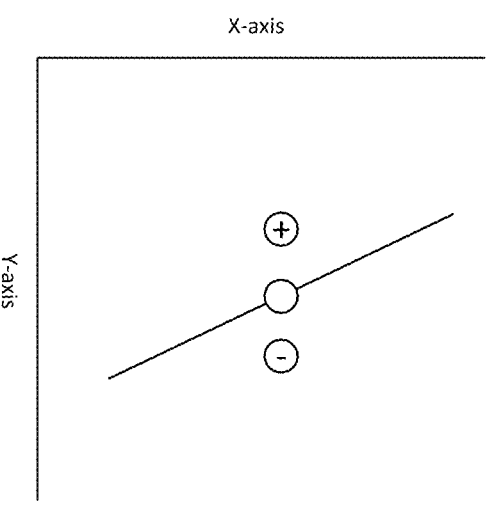
Image Coordinates
(+) Any point with a higher y value at a given x value is above the line.
(−) Any point with a lower y value at a given x value is below the line.
(+) Any point with a lower y value at a given x value is above the line.
(−) Any point with a higher y value at a given x value is below the line.
FIG. 9

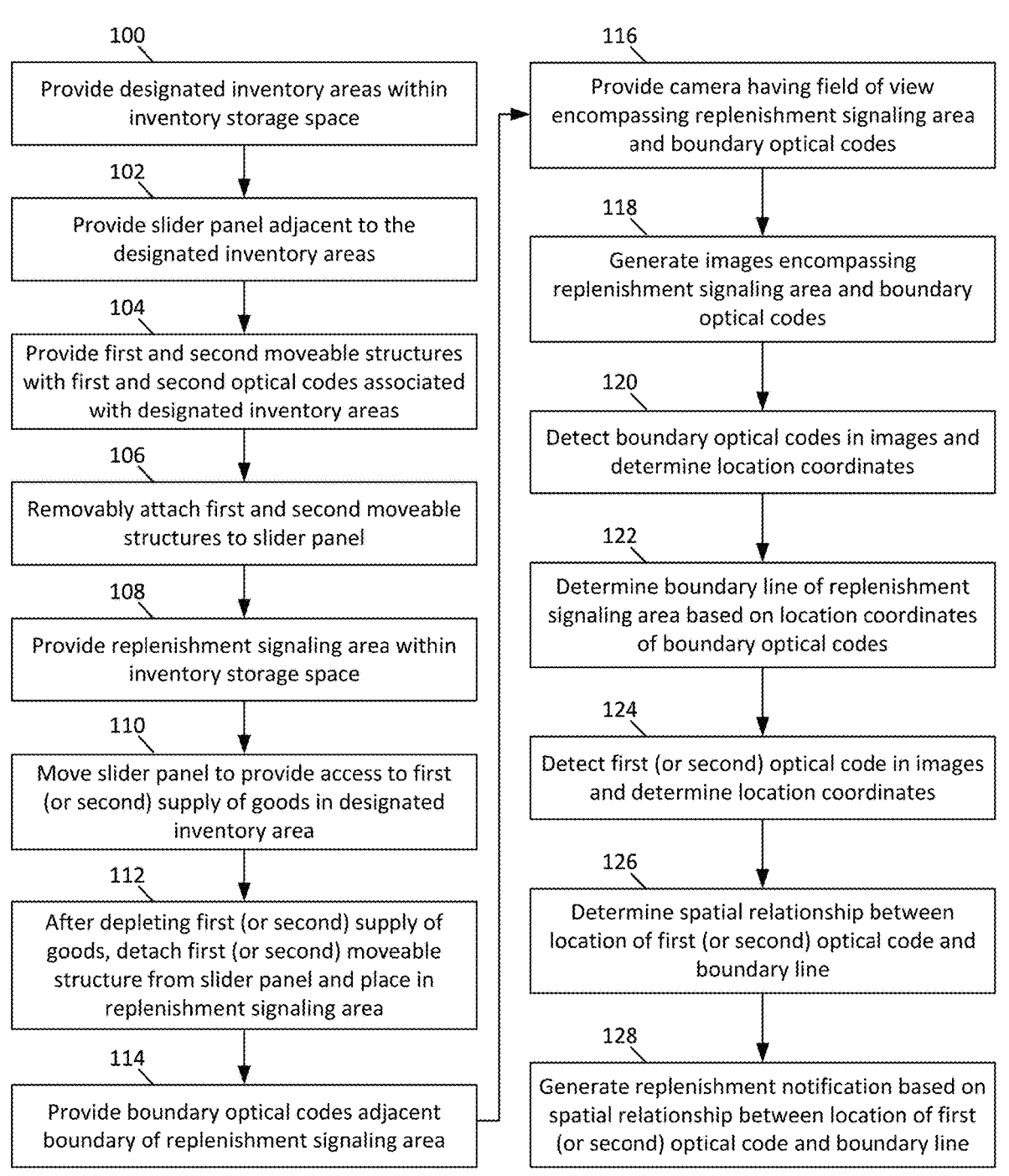

100
Provide designated inventory areas within inventory storage space

102
Provide slider panel adjacent to the designated inventory areas

104
Provide first and second moveable structures with first and second optical codes associated with designated inventory areas

106
Removably attach first and second moveable structures to slider panel

108
Provide replenishment signaling area within inventory storage space

110
Move slider panel to provide access to first (or second) supply of goods in designated inventory area

112
After depleting first (or second) supply of goods, detach first (or second) moveable structure from slider panel and place in replenishment signaling area

114
Provide boundary optical codes adjacent boundary of replenishment signaling area

116
Provide camera having field of view encompassing replenishment signaling area and boundary optical codes

118
Generate images encompassing replenishment signaling area and boundary optical codes

120
Detect boundary optical codes in images and determine location coordinates

122
Determine boundary line of replenishment signaling area based on location coordinates of boundary optical codes

124
Detect first (or second) optical code in images and determine location coordinates

126
Determine spatial relationship between location of first (or second) optical code and boundary line

128
Generate replenishment notification based on spatial relationship between location of first (or second) optical code and boundary line

SHELVING STRUCTURE AND VALIDATION APPARATUS FOR IMPROVED IMAGE PROCESSING OF CODES ON STORAGE BINS

FIELD

This invention relates to the field of inventory management. More particularly, this invention relates to processing images of codes on shelving units and storage bins in a Kanban inventory management system.

BACKGROUND

In the context of this application, Kanban refers to a means of supporting pull-based replenishment in an inventory management system. Kanban (pronounced "Kahn-Bahn") is a Japanese term for "signal," such as an inventory replenishment signal. Generally, Kanban systems are used to manage the supply of low-to-medium cost inventory items that have relatively constant demand, so as to reduce the chance of running out of such supplies. It also creates FIFO (First In, First Out) for inventory to help avoid expired supplies. Traditional Kanban requires staff labor to conduct either a physical count or a visual order, or to manually place a paper Kanban card into a reorder bin, or to move an empty bin from a lower shelf on a shelving unit to the top shelf or other location to trigger a replenishment signal.

Although imaging-based Kanban solutions have been developed for monitoring the placement of empty bins on a top shelf to trigger a replenishment signal, such systems may not operate properly if optical codes on the bins are not sufficiently visible in images of the top shelf. Problems may arise when the angle of the field of view of the camera is not properly aligned with the angle of the bin, or if the bins are arranged such that an optical code on one bin is hidden by another bin. Such problems may be caused by stacking bins on top of each other, or placing one bin in front of another. Other imaging problems include failure to properly center the camera's field of view on the top shelf, failure to properly set the zoom or focus of the camera, improper lighting, and improper cropping of captured images.

What is needed is an imaging-based inventory management solution that employs the Kanban methodology while eliminating or reducing the severity of the aforementioned problems.

SUMMARY

The above and other needs are met by a top shelf structure configured to enhance the visibility of optical codes on empty bins that are placed on the top shelf of a shelving unit, and a validation apparatus to be configured disposed on the top shelf structure for use in a validation procedure that confirms a proper installation and alignment of one or more cameras used in capturing images of the optical codes on the empty bins.

The top shelf structure and the validation apparatus are used in a process of monitoring and replenishing an inventory of goods stored in bins disposed on a multi-shelf shelving unit having a top shelf, wherein the process involves placing empty bins on or above the top shelf to signal that replenishment of the inventory is needed. In a preferred embodiment, the top shelf apparatus comprises a front panel, a middle panel, and a rear panel. The front panel is configured to attach to a front surface of the top shelf of the multi-shelf shelving unit. The front panel has a top edge disposed above the upper surface of the top shelf, and has a forward surface disposed below the top edge. One or more optical codes are disposed on the forward surface of the front panel. The middle panel has a front edge attached to the top edge of the front panel, a rear edge configured to rest upon the upper surface of the top shelf, and a planar surface that slopes downward from the front edge to the rear edge. The planar surface of the middle panel is configured to receive the empty bins. The rear panel, which extends upward from the rear edge of the middle panel, prevents the empty bins from sliding beyond the rear edge of the middle panel.

In some embodiments, the planar surface of the middle panel is disposed at a non-zero angle with respect to the upper surface of the top shelf.

In some embodiments, the non-zero angle is between about 3 degrees and 15 degrees, and is preferably about 5 degrees.

In some embodiments, the one or more optical codes comprise a first optical code disposed adjacent to a first end of the front panel, and a second optical code disposed adjacent to a second end of the front panel opposing the first end.

In some embodiments, the one or more optical codes comprise QR codes or barcodes.

In some embodiments, the distance from the front edge to the rear edge of the middle panel is substantially equivalent to the length of one of the empty bins.

In some embodiments, a channel structure is disposed between the front panel and the front surface of the top shelf that provides for attachment of the front panel to the top shelf.

In some embodiments, a plurality of slots are distributed across the planar surface of the middle panel.

In some embodiments, the top shelf apparatus includes a code holder having a pair of tabs configured to be removably received in a pair of the plurality of slots distributed across the planar surface of the middle panel. The code holder includes one or more attachment mechanisms for removably attaching one or more moveable structures on which one or more optical codes are disposed.

In some embodiments, the one or more attachment mechanisms comprise a hook-and-loop mechanism, a magnetic mechanism, or a snap mechanism.

In some embodiments, the top shelf apparatus includes a first aperture disposed adjacent to a first end of the front panel and a second aperture disposed adjacent to a second end of the front panel. The first and second apertures are configured to receive fasteners for attaching the front panel to the top shelf.

In some embodiments, the top shelf apparatus includes a challenge board disposed on the middle panel. The challenge board is also referred to herein as a validation apparatus. In a preferred embodiment, the challenge board comprises a bottom panel and a top panel. The bottom panel is disposed on the planar surface of the middle panel, and has a rear edge that abuts the rear panel and a front edge spaced apart from the rear edge. The top panel extends upward from the front edge of the bottom panel, and a plurality of optical perimeter codes are attached to a forward surface of the top panel. A plurality of protrusions extend outward from the top panel, each of which is configured to simulate a portion of a first bin stacked above a forward surface of a second bin. Each protrusion includes an optical bin simulation code disposed on its forward surface.

In some embodiments, each of the plurality of protrusions includes a rear support structure attached to and extending outward from the forward surface of the top panel, a front portion supported by the rear support structure, and a stacked bin simulation structure disposed above the front portion.

In some embodiments, the top panel of the challenge board is rectangular and has four corners, and the plurality of optical perimeter codes include at least four perimeter codes that include a perimeter code attached adjacent each of the four corners.

In another aspect, embodiments of the invention are directed to a computer-implemented method for using the challenge board to validate proper installation and operation of the camera. In a preferred embodiment, the method includes:

(a) placing the challenge board on or above the top shelf of the multi-shelf shelving unit with the forward surface of the top panel facing the camera;

(b) the camera capturing an image of at least a portion of the forward surface of the top panel of the challenge board; and (c) processing the image using image processing software to determine whether one or more of the optical perimeter codes or one or more of the optical bin simulation codes are present therein.

In some embodiments, based on determining that none of the optical perimeter codes and none of the optical bin simulation codes are present in the image, the image processing software continues to operate in an inventory processing mode while repeating steps (b) and (c).

In some embodiments, based on determining that at least one of the optical perimeter codes or at least one of the optical bin simulation codes are present in the image, the image processing software begins to operate in a validation mode and sends a confirmation message to a user to indicate that the validation mode is active.

In some embodiments, based on determining that at least one but not all of the optical perimeter codes or at least one but not all of the optical bin simulation codes are present in the image, the image processing software sends a validation fail message to the user while repeating steps (b) and (c).

In some embodiments of the method, the validation fail message provides recommendations to the user for making adjustments to the camera setup.

In some embodiments, the image processing software prevents the camera from being used in an inventory monitoring mode until it is determined that all of the optical perimeter codes and all of the optical bin simulation codes are present in the image.

In some embodiments, based on determining that all of the optical perimeter codes and all of the optical bin simulation codes are present in the image, the image processing software sends a validation confirmation message to the user to indicate that the installation and operation of the camera is valid, and ceases operation in the validation mode, and begins operation in an inventory monitoring mode.

BRIEF DESCRIPTION OF THE DRAWINGS

Other embodiments of the invention will become apparent by reference to the detailed description in conjunction with the figures, wherein elements are not to scale so as to show the details more clearly, wherein like reference numbers indicate like elements throughout the several views, and wherein:

FIG. 9 depicts a normal two-dimensional algebraic coordinate system compared with a two-dimensional image pixel coordinate system;

FIG. 11 depicts a method for implementing the inventory management system shown in FIGS. 10A-10C;

Figure 13:
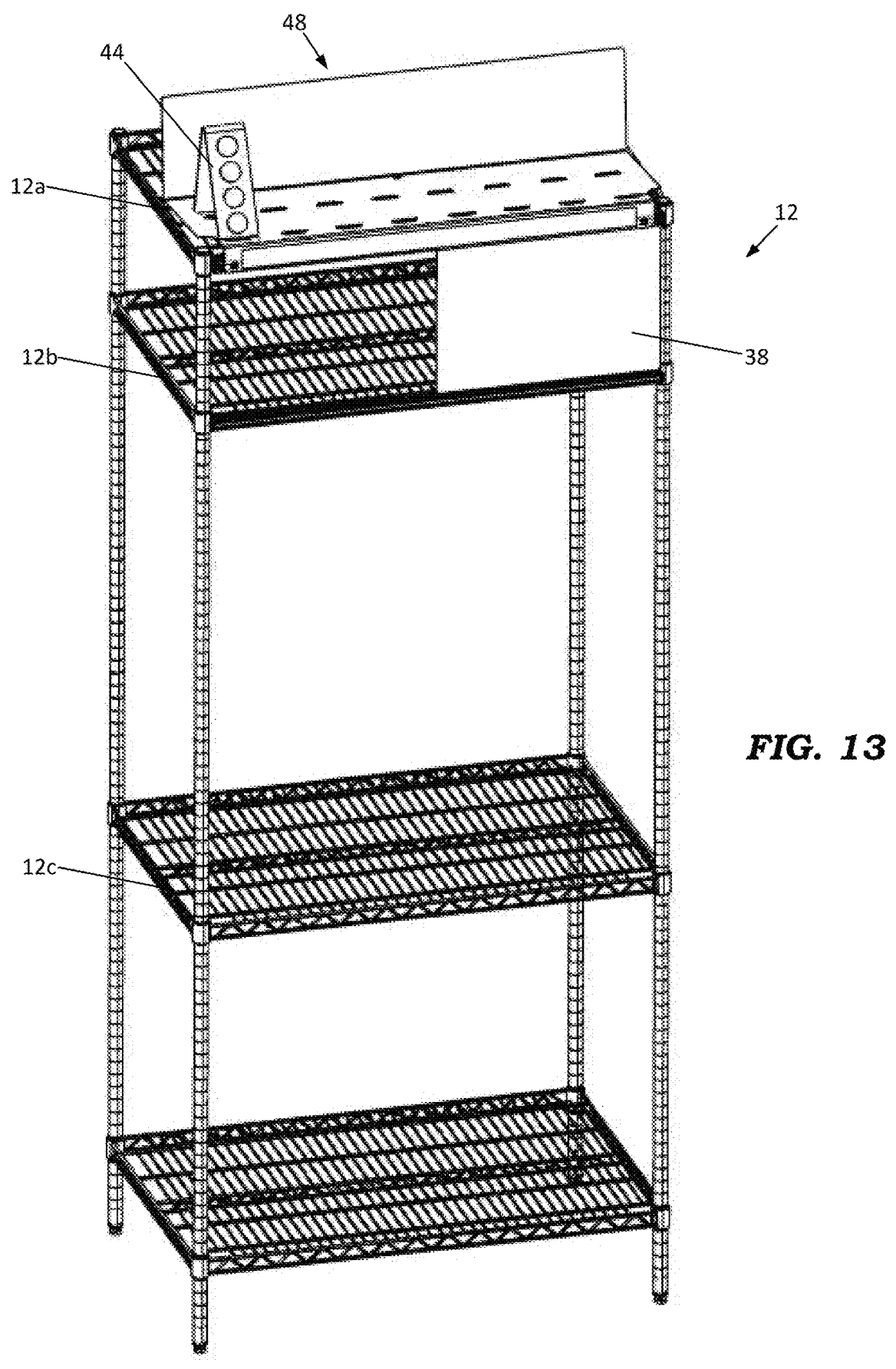

FIGS. 13-17 depict an inventory management system that includes a bin receiving structure on its top shelf according to an embodiment of the invention;

DETAILED DESCRIPTION

Figure 1:
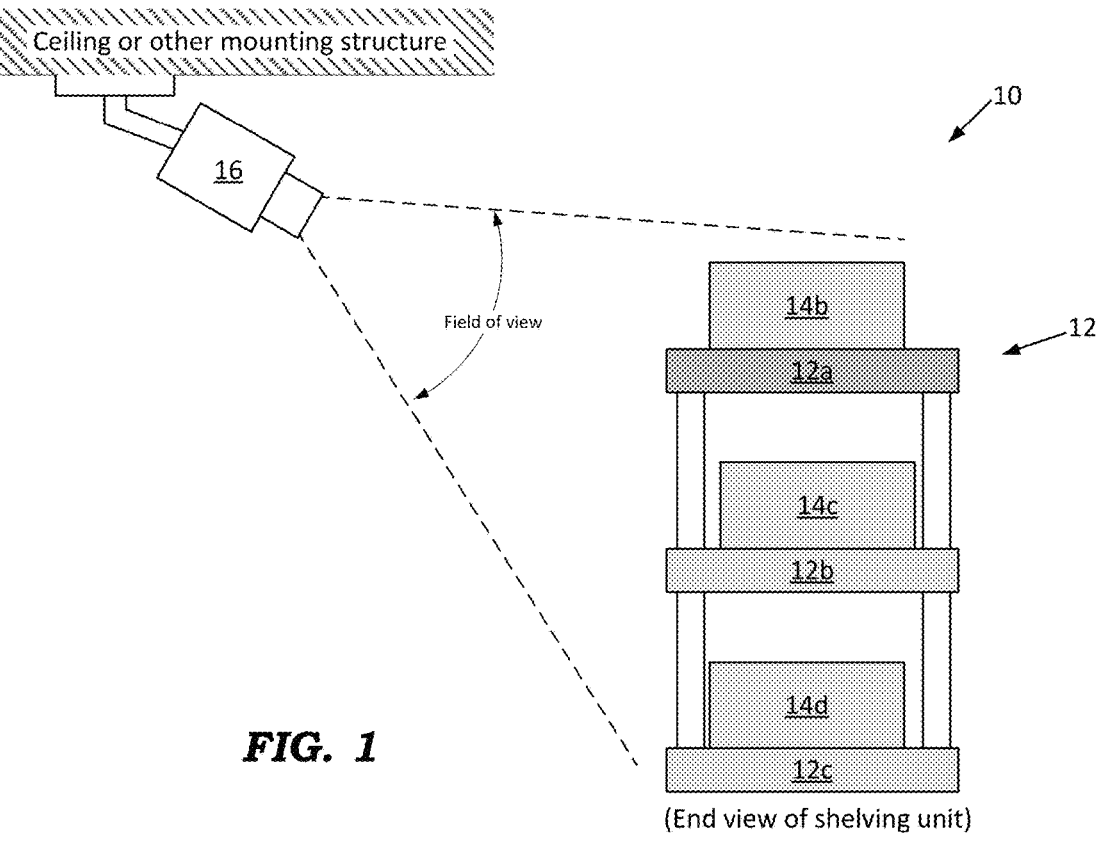
FIGS. 1 and 2 depict a physical configuration of an inventory management system according to an embodiment of the invention.
Figure 2:
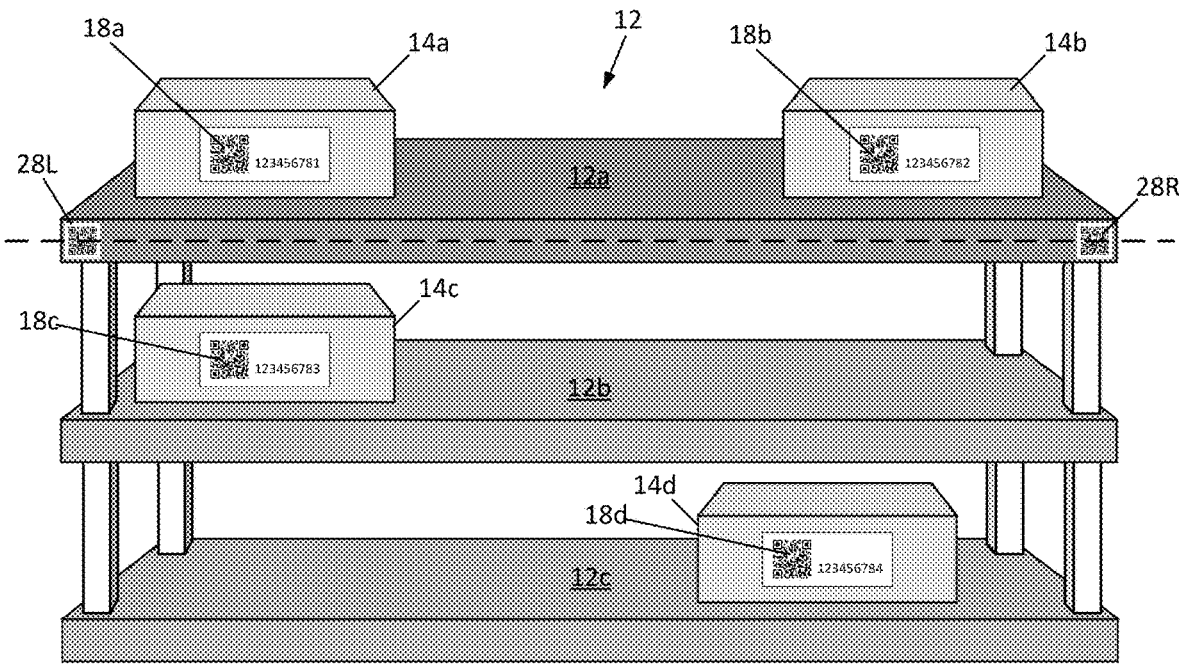

As shown in FIGS. 1 and 2, an inventory management system 10 includes an inventory shelving unit 12 having multiple shelves 12a, 12b, 12c on which bins 14a, 14b, 14c, 14d are placed for holding inventory items in an inventory room. An end view of the shelving unit 12 is depicted in FIG. 1 and a front view is depicted in FIG. 2. It will be appreciated that the shelving unit 12 may include fewer or more than the number of shelves depicted in FIGS. 1 and 2.

A storage bin, such as the bins 14a-14d, is one example of a distinct inventory area in which inventory may be stored while awaiting use. A portion of a shelf is another example of a distinct inventory area.

In one version of a Kanban inventory replenishment system, bins that contain inventory items are kept on the lower shelves, such as shelves 12b and 12c, whereas the top shelf 12a is reserved for the placement of empty bins. The placement of an empty bin on the top shelf is a "signal" that replenishment of inventory is needed. In conventional Kanban systems, prompted by this signal, a person responsible for maintaining the stock of supplies in the inventory room would take action to reorder or otherwise obtain resupply of the items associated with an empty bin placed on the top shelf. In such prior systems, the responsible person would have to take some manual action to initiate the reorder/resupply process.

The top shelf of a shelving unit is one example of the replenishment signaling area in which the placement of an optically encoded structure causes generation of a replenishment signal. This area is also referred to herein as a "landing zone." It will be appreciated that another area besides the top shelf of a shelving unit may be designated as the replenishment signaling area. For example, a left or right portion of any of the shelves of the shelving unit may be so designated, or a separate structure altogether may be so designated, such as a table, countertop, or cart.

In a preferred embodiment of the present disclosure, one or more cameras 16 are mounted to the ceiling or other mounting structure within an inventory storage room in which the shelving unit 12 is located. Preferably, each camera 16 is positioned such that it has a field of view that encompasses all or a portion of the shelves 12a-12c of the unit 12, such as the view depicted in FIG. 2. The positioning of each camera 16 should take into account the distance and the angle of the camera 16 with respect to the shelving unit 12. In some embodiments, the field of view of at least one camera 16 may encompass only the top shelf 12a. In some embodiments, one or more of the cameras 16 are mounted on a horizontal and/or vertical track system that provides for moving the position of the camera(s) 16 with respect to one or more shelving units 12. This enables the system to capture images of more shelving space with fewer cameras. In some embodiments, one or more of the cameras 16 include infrared capabilities for operating in low light conditions. In some embodiments, one or more of the cameras 16 may include other features such as remotely-adjustable zoom, tilt and pan.

Each camera 16 is in communication with a processor 20 that is operable to periodically capture images corresponding to the camera's field of view. The connection between the camera(s) 16 and the processor 20 may be wired or wireless, such as via a communication network. In a preferred embodiment, each captured image comprises a rectangular grid of x number of pixels by y number of pixels. The captured image is of sufficient quality and resolution to allow processing of the image to extract optical codes therefrom reliably and accurately.

As shown in FIG. 2, each bin 14a-14d includes an electronically detectable element, such as an optical code 18a-18d, disposed on a visible portion of the bin. In some embodiments, the optical codes 18a-18d are QR codes or bar codes. In an alternative embodiment, the electronically detectable elements are RFID tags attached to the bins. In the RFID embodiment, RFID readers are employed to detect and decode information encoded in the tags.

Figure 3:
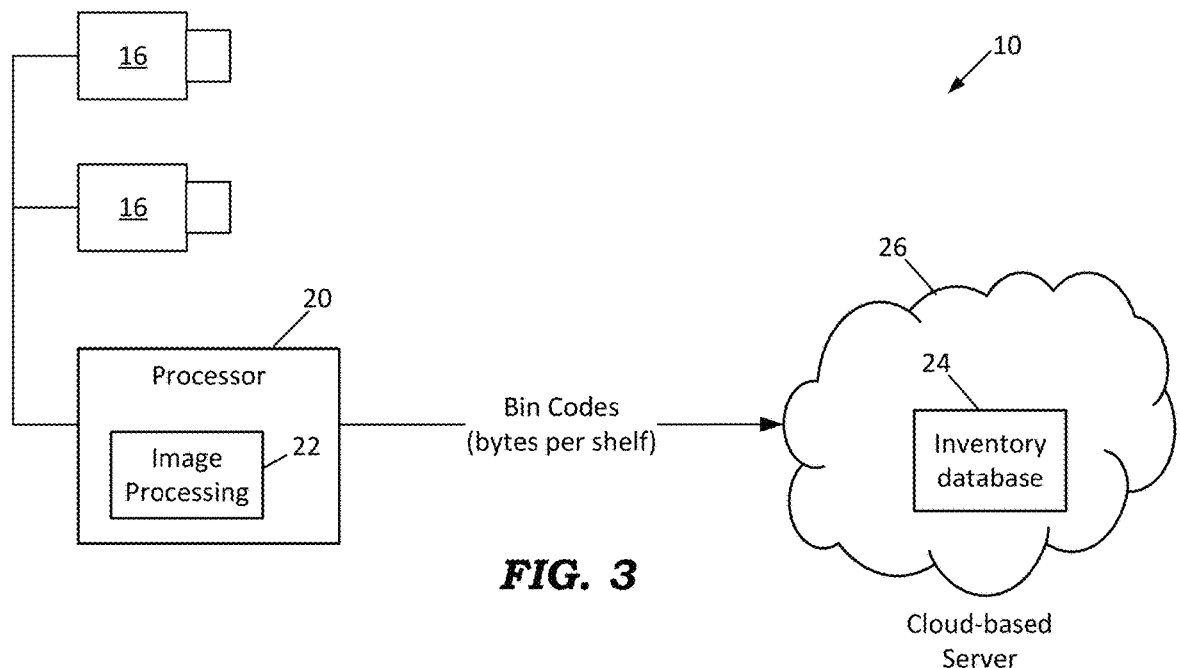
FIGS. 3 and 4 depict block diagrams of an inventory management system according to embodiments of the invention.
Figure 4:
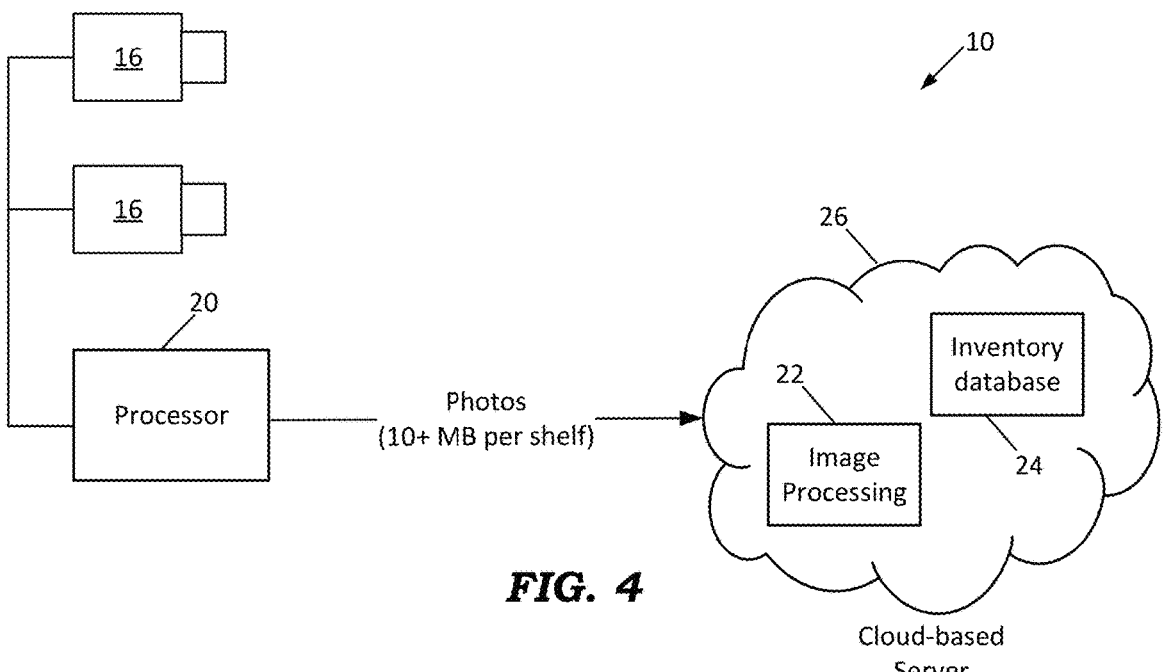

In a preferred embodiment, each bin code encodes a unique identification number identifying a particular supply item in an associative inventory database 24 that resides on a cloud-based server 26, such as depicted in FIGS. 3 and 4. If the field of view of the camera 16 is properly aligned with the shelving unit 12, and the bins are properly placed so that the bin codes 18a-18d are within the camera's field of view, images captured by the processor 20 will include the bin codes 18a-18d attached to the bins 14a-14d. Image processing software 22 processes the pixels in each captured image to find and decode the bin codes 18a-18d present therein. One example of such software 22 is barcode scanner software from Dynamsoft that is operable to detect multiple codes in a single image.

In a preferred embodiment, it is desirable to determine, based on one or more captured images, whether a bin has been placed on the top shelf 12a. For example, in the image depicted in FIG. 2, the image processing software 22 should identify four bin codes 18a, 18b, 18c, 18d, extract the encoded unique identification number for each, and assign an x-y coordinate location to each code based on x-y coordinates of image pixels associated with each of the codes.

In order to determine if any bins are on the top shelf 12a, it must first be determined where the top shelf is in relation to the locations of the bin codes 18a-18d detected in the image. In preferred embodiments, the top shelf 12a is identifiable in the captured image based on one or more optical top shelf codes attached to a forward-facing surface of the top shelf 12a. In a most preferred embodiment, there are two top shelf codes: a top shelf code 28L disposed at the left end of the top shelf 12a and a top shelf code 28R disposed at the right end, as shown in FIG. 2. The image processing software 22 identifies the left and right top shelf codes 28L and 28R and assigns a reference x-y coordinate location to each identified code based on x-y coordinates of image pixels associated with each of the top shelf codes 28L and 28R. For example, coordinates x=0, y=0 may be assigned to top shelf code 28L and coordinates x=48, y=0 may be assigned to top shelf code 28R. The equation of a straight line is y=mx+b, where m is the slope and b is the y-intercept. In this case wherein m=0 and b=0, the equation of a line through the locations of the top shelf codes 28L (x=0, y=0) and 28R (x=48, y=0) is simply y=0. In this example, any bin code having location coordinates in which the y coordinate component is a non-zero positive number is above the boundary line and thus above the top shelf 12a.

Figure 5:
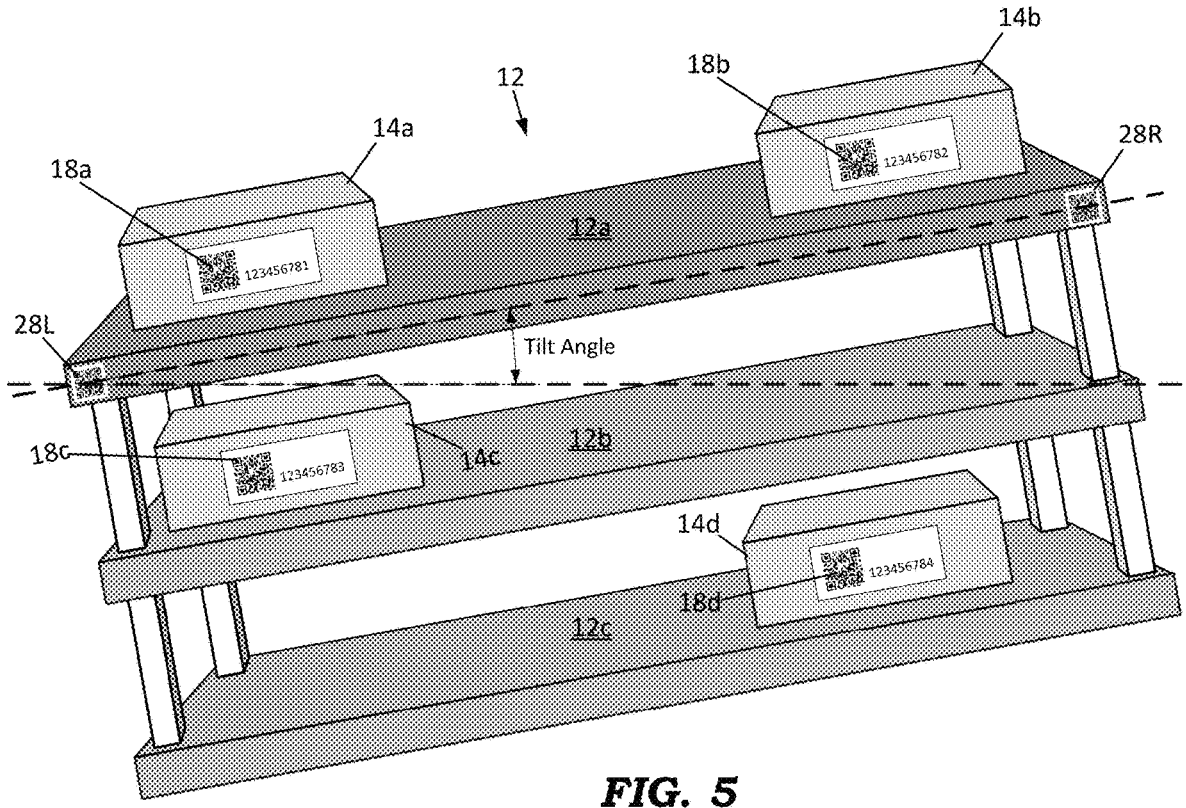
FIG. 5 depicts a physical configuration of an inventory management system according to an embodiment of the invention.

Now consider an example such as depicted in FIG. 5 in which the camera 16 is tilted with respect to the shelving unit 12 (or the shelving unit 12 is tilted with respect to the camera 16). Again, the image processing software 22 identifies the left and right top shelf codes 28L and 28R and assigns location x-y coordinates to each identified code based on x-y coordinates of image pixels associated with each of the codes 28L and 28R. For example, coordinates x=0, y=0 may be assigned to top shelf code 28L and coordinates x=46, y=8 may be assigned to top shelf code 28R. In this case, the slope m=8÷46=0.174, and the y-intercept b=zero, in which case the equation of the boundary line passing through the top shelf codes 28L and 28R is:

$$y = mx + b,$$
$$y = 0.174x + 0,.$$
$$y = 0.174x$$

In this example, if a bin code has location coordinates defining a point that is above the boundary line passing through the top shelf codes 28L and 28R as defined by the equation y=0.174x, the location of the bin code is above the top shelf 12a. In other words, a bin code is located above the top shelf 12a if the shortest distance between the location of the bin code and the boundary line passing through the top shelf codes 28L and 28R is a non-zero positive number.

Determining whether the bin code is located above or below the top shelf 12a may be done as follows. Given a line y=mx+b and a point $(x_3, y_3)$ at which the bin code is located, substitute the point's x value (i.e., $x_3$) into the equation of the line (i.e., $y=m \times x_3+b$) and solve for y. The relationship between the point's y value (i.e., $y_3$) and the y value (computed in the preceding step) determines whether the point is above or below the line.

It will be appreciated that the relationship condition ($y_3>y$ or $y_3<y$) is determined based on the location of the origin. As depicted in FIG. 9, in normal algebra in the positive quadrant (Quadrant I), the origin is in the bottom left. In image processing, the origin is frequently in the top left, such that lower y values are above higher y values. In normal algebra, higher y values are above lower y values.

In a preferred embodiment, the following programming code is used for the above-described calculations.

```
private static bool IsAboveLine (double x1, double y1, double x2, double
y2, double x3, double y3)
{
   // slope of the line
   double m = (y2 – y1) / (x2 – x1);
   // y-intercept of the line
   double b = y1 – (m * x1);
   // y-coordinate of the point when plugged into the equation of the
line
   double y = (m * x3) + b;
   // check if the point is above or below the line
   if (y3 > y)
   {
      return false;
   }
   else
   {
      return true;
   }
}
```

In some embodiments, if only one of the shelf top codes 28L and 28R is detected in the image, the top right and top left points of the code can be used to construct a boundary line corresponding to the position of the top shelf 12a. In some embodiments, unique identification information encoded in the top shelf codes is used to identify the shelving unit 12 and its location within an inventory room or storage facility.

In some embodiments the top shelf codes may also be used to confirm the camera 16 is working properly, and to tune the camera setup, such as by adjusting the focus, zoom level, tilt angle, and other settings. This setup operation may also include computing an estimated distance to each of the top shelf codes.

In some embodiments, a top shelf code comprises a color code, wherein a certain color is associated with and identifies the top shelf 12a of the shelving unit 12. In some embodiments, a top shelf code comprising a color code may have an elongate shape that stretches horizontally across a substantial portion of a front edge of the top shelf.

In some embodiments, a light source is included to illuminate the replenishment signaling area in which empty bins should be placed on the top shelf 12a. Alternatively, LEDs may be attached to the top shelf 12a to indicate the location of the landing zone.

In the embodiment of the system 10 depicted in FIG. 3, the image processing software runs on the processor 20 connected to the one or more cameras 16. The connection between the one or more cameras 16 and the processor 20 may be wired or wireless. In the embodiment of FIG. 3, the data transferred from the processor 20 across the communication network to the cloud-based server 26 generally comprises non-image data, such as product identification numbers and location coordinates associated with bin codes. The data in this case would be on the order of a few bytes per shelf. In an alternative embodiment depicted in FIG. 4, the image processing software runs on the cloud-based server 26. In this embodiment, the data transferred from the processor 20 across the communication network to the cloud-based server 26 comprises image data captured by the one or more cameras 16. The data in this case would be on the order of hundreds of kilobytes per shelf, and will vary depending on the type of the camera(s)16 employed.

According to various embodiments, images are pulled from the camera 16 or are pushed from the camera 16 to the processor 20 or to the cloud-based server 26. Images may be pulled one at a time or pulled in various parallel processing configurations. In some embodiments, image processing and enhancing mechanisms may be utilized to improve the accuracy of the system 10, such as focus shifting, image stacking, etc.

The system described herein can also be used in situations in which there are two or more distinct inventory areas on a shelf for each product, and each of the inventory areas include an optically encoded element that may be placed on the top shelf when stock in the corresponding inventory area is depleted. For example, some inventory items are not compatible with placement in bins due to their size or shape. In those situations, the inventory items may be placed within distinct inventory areas on the shelf, along with an optically encoded "bookend," card, sliding panel, or other structure that identifies each of the distinct inventory areas.

Figure 7A:
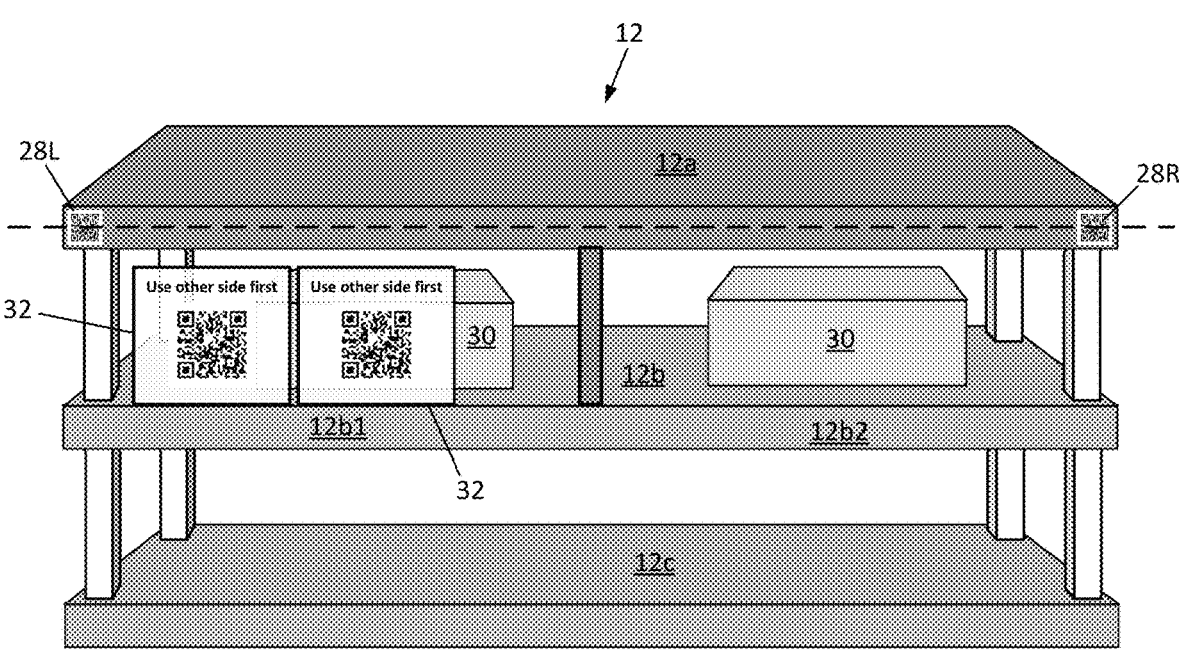
FIGS. 7A, 7B and 7C depict a physical configuration of an inventory management system according to an embodiment of the invention.
Figure 7B:
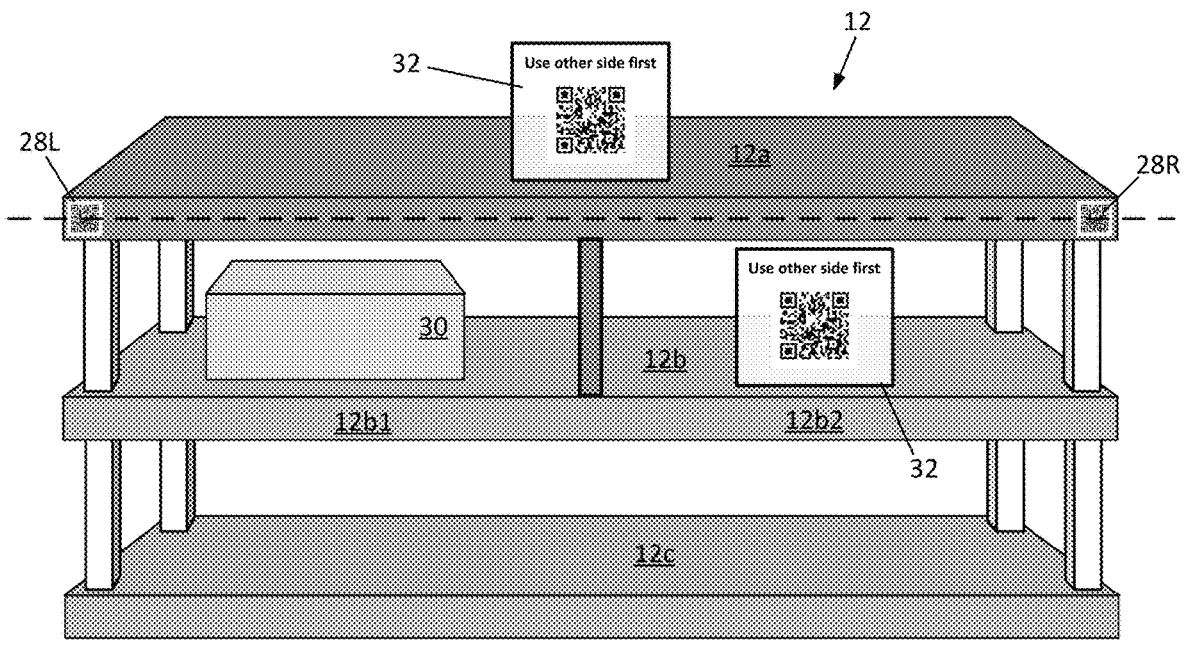
Figure 7C:
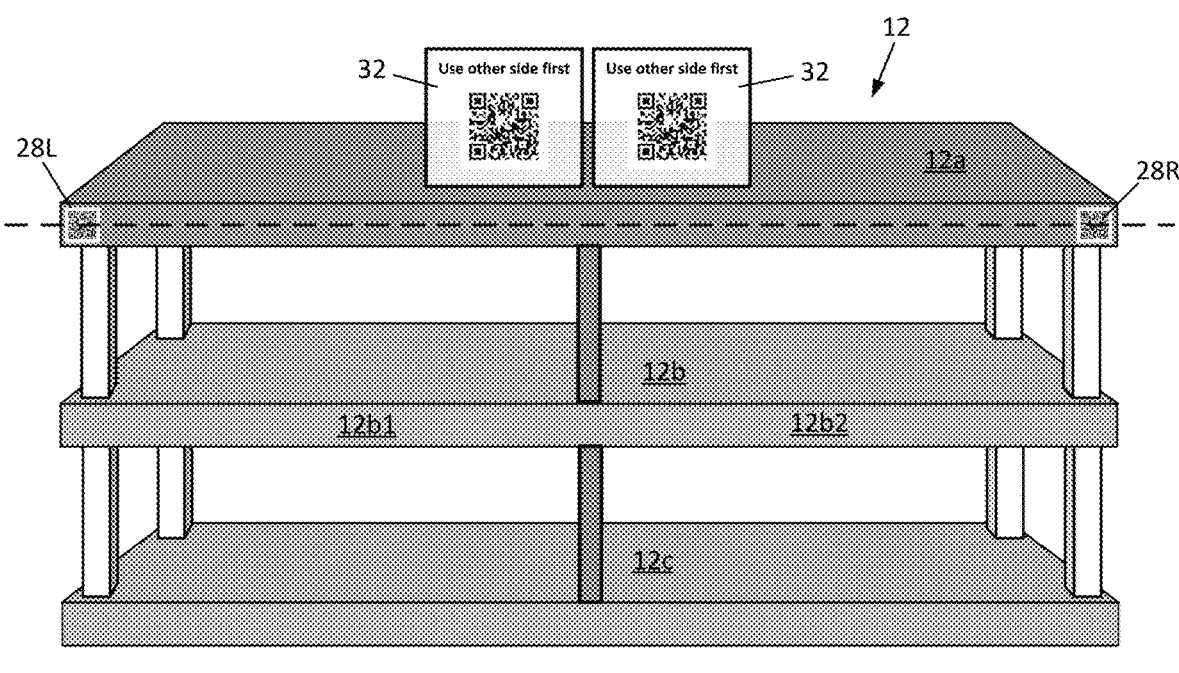

FIGS. 7A-7C depict a shelving unit 12 that includes two distinct inventory areas 12b1 and 12b2 of shelf 12b for holding the same type of product, and two bookend codes 32 each associated with a corresponding one of the inventory areas. As shown in FIG. 7A, when both distinct inventory areas contain stock of the product, both bookend codes 32 are placed on one side, and stock is accessed from the other side until it is depleted. As shown in FIG. 7B, when stock of the product in area 12b2 has been depleted, one of the bookend codes 32 is placed on the top shelf 12a as a replenishment signal and the other bookend code 32 is placed within the depleted area 12b2. As shown in FIG. 7C, when stock of the product in area 12b1 has also been depleted, both of the bookend codes 32 are placed on the top shelf 12a. Thus, the bookend codes 32 of this embodiment provide the same replenishment signal function in the resupply process as the bin codes of other embodiments.

In an alternative embodiment, a coded element may automatically become visible on the top shelf 12a when a user does something to indicate a distinct inventory area is empty. For example, moving a sliding panel from covering one distinct inventory area to covering another distinct inventory area could cause a coded card on the top shelf 12a to move from a horizontal position to a vertical position so as to become visible to the camera 16.

Some embodiments include features that enhance the readability of an optical code so that the image processing software 22 will have a higher rate of success in detecting and properly decoding a code within an image being processed. These features may include one or more of:
   using less reflective label stock on which the optical codes are printed;
   using less reflective ink for printing the optical codes;
   using a lower density code;
   using a larger code size;
   providing more white space around the code;
   using infrared responsive ink to improve detection in low light conditions;
   providing a protective coating over the printed code to extend its life;

using a protective coating that is less reflective so as to not interfere with image processing.

In all Kanban inventory systems (manual, semi-manual, or automated), a common problem is double ordering. Double ordering occurs when the event that triggered the order triggers the order a second time. For example, consider the following semi-manual scenario.

1. An empty bin is placed on the top shelf.
2. A user scans each bin on the top shelf using a handheld scanner which generates 15 orders for the needed supplies.
3. A few hours later, 14 of the 15 ordered supplies are brought to the room, and 14 of the 15 bins are restocked and put back on lower shelves. One of the 15 bins is left on the top shelf.
4. The next day, a user scans each bin on the top shelf using a handheld scanner which generates an order. Because the bin from the previous day is still on top, a second order is generated for that bin.
5. The next day, both orders are filled resulting in twice as many of the supplies being delivered to the inventory location.

Another example involves an automated Kanban system having high-frequency (HF) RFID cards attached to each bin. The HF RFID cards have a very short reading range (i.e., a few inches). When a bin is empty, a user removes the card from the bin and places the card on a board that is equipped with an HF RFID reader. Once a day an order is generated for any supplies for which corresponding HF RFID cards are on the board. Consider the following scenario involving such a system.

1. A user puts a card from an empty bin on the board at 3 pm on Monday.
2. An order for the supplies associated with the card is generated at 6 pm Monday.
3. The supplies are received at 10 am Tuesday.
4. The user restocks the bin but forgets to remove the card from the board.
5. Another order is generated at 6 pm Tuesday because the card is still on the board.
6. The supplies are received at 10 am Wednesday resulting in overstocking of the supplies associated with the card that was inadvertently left on the board.

The key to avoiding such problems is to know the state of each bin. Otherwise, if a bin is left on the top shelf (or an RFID card is left on the board) through multiple order cycles, orders will be generated each time.

In a preferred embodiment of the system 10, three possible states are always known for each distinct inventory area, such as each bin:

OnShelf;
OnTop; and
OnOrder.

If a user has 10,000 bins, the system tracks 10,000 states (one for each bin). Bins can only transition to other states in very specific ways, as illustrated in the state machine diagrams depicted in FIG. 6A (first embodiment) and FIG. 6B (second embodiment).

In the first embodiment (FIG. 6A), if a bin is in the OnShelf state 32, it can change to only the OnTop state 34. If a bin is in the OnTop state 34, it can change to either the OnShelf state 32 or the OnOrder state 36. If a bin is in the OnOrder state 36, it can change to only the OnShelf state 32. The act of transitioning from OnTop 34 to OnOrder 36 results in the generation of a replenishment signal that causes an order to be placed for the supplies associated with the bin. Because this transition can happen only once, regardless of how long the bin is left on the top shelf, supplies are ordered only once. A preferred embodiment of the system 10 implements transition controls to prevent transient errors from triggering false state transitions.

OnShelf to OnTop. It is very unlikely that a transient error condition would cause a bin to appear on the top shelf when the bin is not on the top shelf. No transition controls are needed for the OnShelf to OnTop state transition.

OnTop to OnShelf. Since it is very likely that a transient error could cause an optical code to not be seen in any given image, a preferred embodiment of the system 10 implements transition controls for this state transition.

Examples of transient errors:

A person standing in front of the shelving unit 12 blocks the camera's view of one or more optical codes.

A transient change in lighting makes one or more optical codes temporarily unreadable.

Exemplary transition control: An optical code must not be detected on the top shelf in at least six consecutive images in at least 60 consecutive minutes before this state transition is allowed.

OnTop to OnOrder. Since it is very unlikely that any bin would be in the OnTop state due to an error condition, no transition controls are needed for the OnTop to OnOrder transition.

OnOrder to OnShelf. A preferred embodiment of the system 10 implements the same transition control for this state transition as are implemented for the OnTop to OnShelf transition.

Figure 6A:
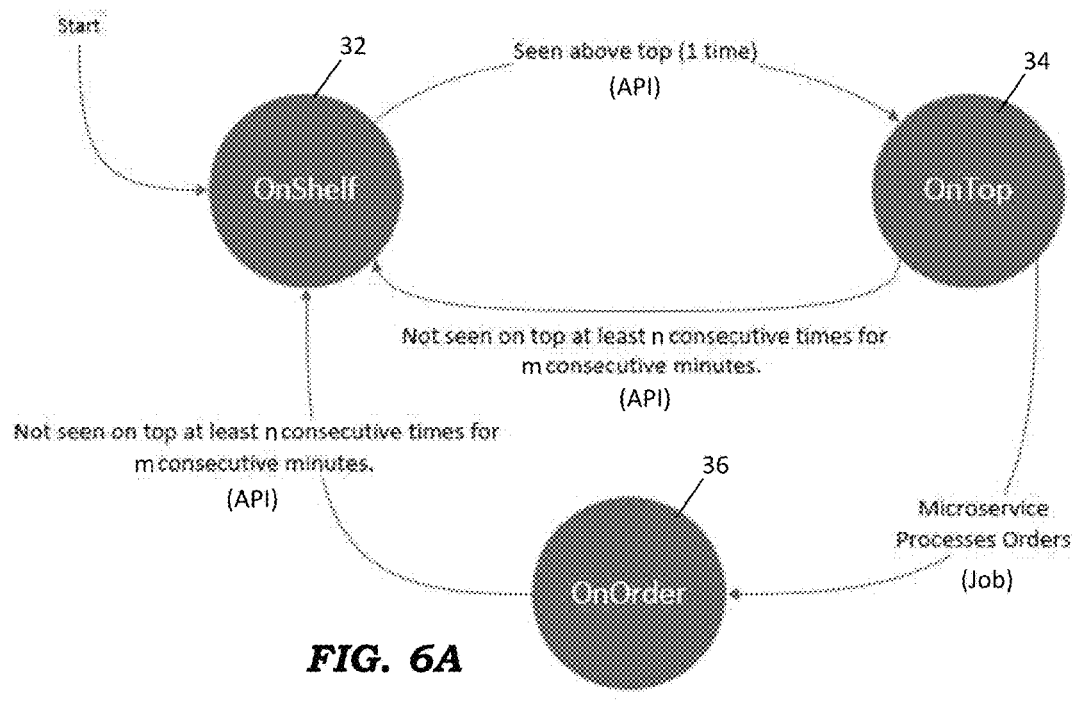
FIGS. 6A and 6B depict state machines of an inventory management system according to two embodiments of the invention.

Thus, as depicted in FIG. 6A, the state machine requires certain criteria to be met before a state transition is allowed. As discussed above, each distinct inventory area (such as a bin or a portion of a shelf) associated with an optical code is in one of the three states: OnShelf 32, OnTop 34, or OnOrder 36. The initial state of a distinct inventory area represented by a code is OnShelf. Whenever the code representing a distinct inventory area that is currently OnShelf is detected as being on the top shelf 12a, the state of that distinct inventory area transitions to OnTop. If the code representing a distinct inventory area that is OnTop ceases to be detected on the top shelf 12a for a configurable amount of time or number of consecutive times, the state of that distinct inventory area transitions to OnShelf. Periodically, the system processes orders by transitioning any distinct inventory area that is OnTop to OnOrder, and based on the transition, the system sends or queues a replenishment signal for that distinct inventory area. Optionally, the system may be configured to not immediately process distinct inventory areas that recently transitioned to OnTop (e.g., transitioned within the last 30 minutes).

If the code representing a distinct inventory area that is OnOrder ceases to be detected on the top shelf 12a for a configurable amount of time or number of consecutive times, the state of that distinct inventory area transitions to OnShelf. Since replenishment notifications are sent or queued based only on a distinct inventory area transitioning from OnShelf to OnOrder, any distinct inventory area that is OnOrder does not generate a new replenishment signal until after it has been removed from the top shelf 12a and placed back on one of the lower shelves.

With reference to FIG. 6A, following is an example of a possible state machine flow for a distinct inventory area, assuming m=6 and n=60:

State is OnShelf

. . .

Image 1: Detected→OnTop (update last time detected)

. . .

Image 48: Detected→N/A (update last time detected)
Order processed: →OnOrder
Image 49: Detected→N/A (update last time detected)

. . .

Bin is restocked (a human physically restocks the bin and puts it back on the lower shelf)

Image 550: Not Detected (count++)=1 (last time detected=10 min ago)→N/A

Image 551: Not Detected (count++)=2 (last time detected=20 min ago)→N/A

Image 552: Not Detected (count++)=3 (last time detected=30 min ago)→N/A

Image 553: Not Detected (count++)=4 (last time detected=40 min ago)→N/A

Image 554: Not Detected (count++)=5 (last time detected=50 min ago)→N/A

Image 555: Not Detected (count++)=6 (last time detected=59.9 min ago)→N/A

Image 556: Not Detected (count++)=7 (last time detected=69.9 min ago)→OnShelf

Figure 6B:
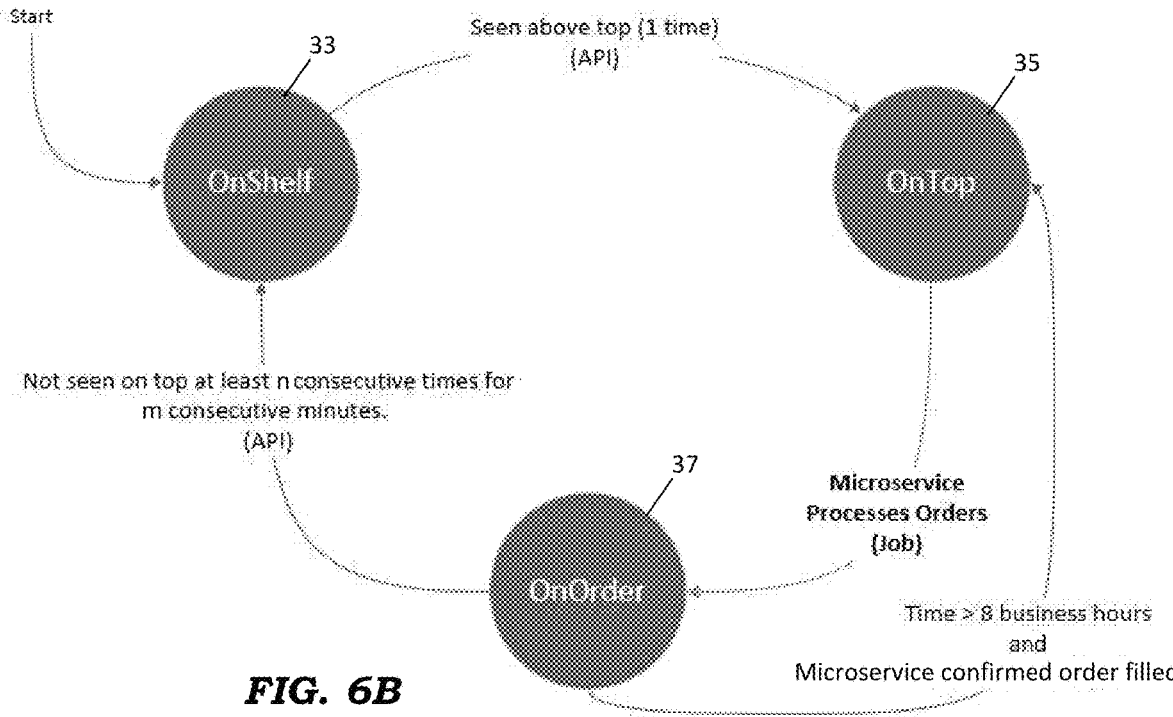

In the second embodiment of the state machine depicted in FIG. 6B, if a bin is in the OnShelf state 33, it can change only to the OnTop state 35. If a bin is in the OnTop state 35, it can transition only to the OnOrder state 37. If a bin is in the OnOrder state 37, it can change either to the OnShelf state 33 or back to the OnTop state 35. The act of transitioning from the OnTop state 35 to the OnOrder state 37 results in generation of a replenishment signal for the supplies associated with the bin. Under normal conditions, because this transition can happen only once regardless of how long the bin is left on the top shelf, supplies are ordered only once.

The transition from the OnOrder state 37 back to the OnTop state 35 in the second embodiment occurs if (1) the status of the associated line item in the reordering requisition is "filled", (2) more than some threshold level of time has passed, such as 8 or 24 hours, since the status of the associated line item in the reordering requisition was set to "filled", and (3) the bin for the reordered items is still detected as being on the top shelf. This transition from the OnOrder state 37 back to the OnTop state 35 compensates for problems that may occur in the resupply chain, such as described below.

Generally, once the reordering system has determined the status of each line item in a reordering requisition, the system sends an electronic message that includes the status of each reordered item, wherein the status is generally either filled, back ordered, or killed. A line item status of "filled" means there is sufficient stock in the inventory system to fill the quantity requested. In that case, it is expected that the associated bin will be removed from the top shelf, refilled, and replaced on a lower shelf within a certain expected time, such as 8 hours or 24 hours. If the expected time is exceeded, it is assumed that one of the following problems has occurred, in which case the associated item should be reordered:

the "two bin" problem has occurred, as described hereinafter;

the ordered item was somehow misappropriated on its way to the inventory location, such as by accidental delivery to the wrong inventory room or accidental shipment to another facility; or something else happened to the reordered item, and it is not expected to ever arrive in the correct inventory location.

The Two-Bin Problem.

Figure 12A:
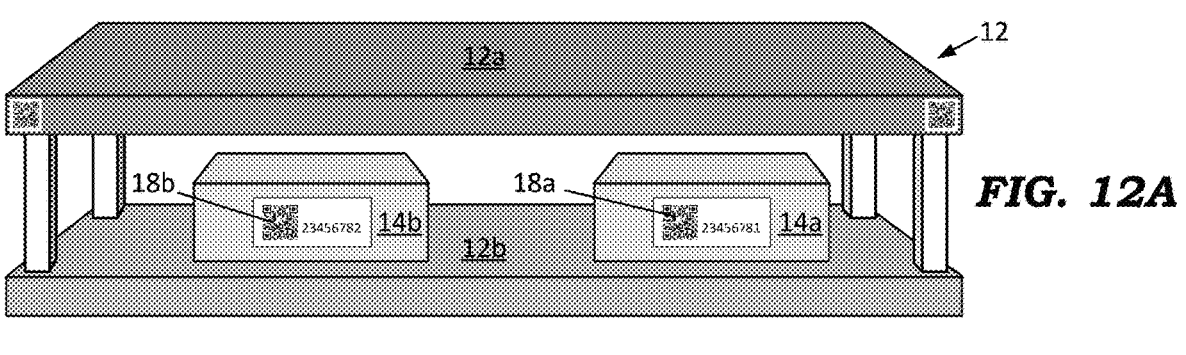
FIGS. 12A-12D depict a sequence of events referred to herein as the two-bin problem.
Figure 12B:
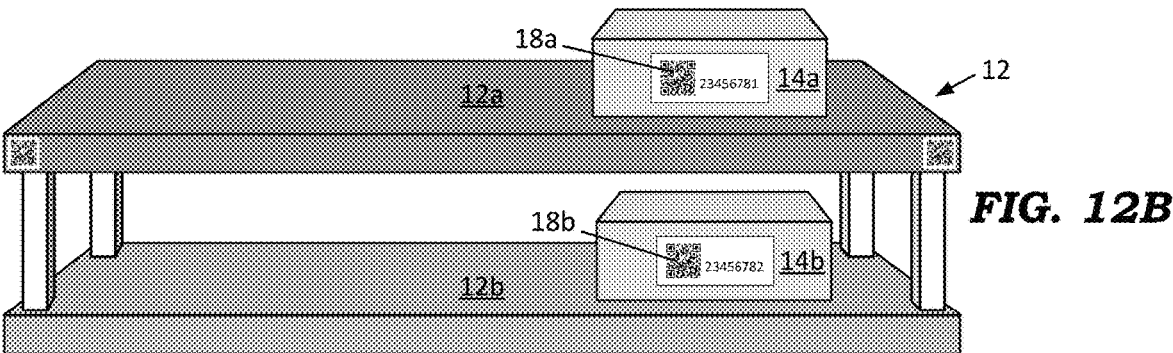
Figure 12C:
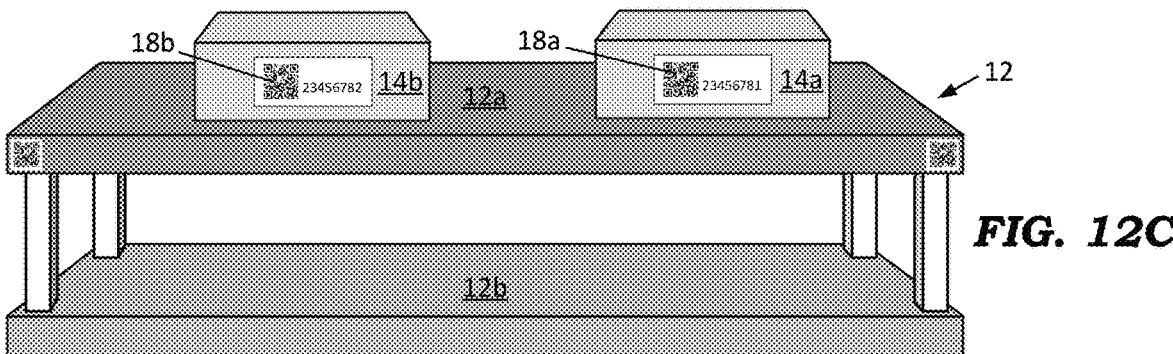
Figure 12D:
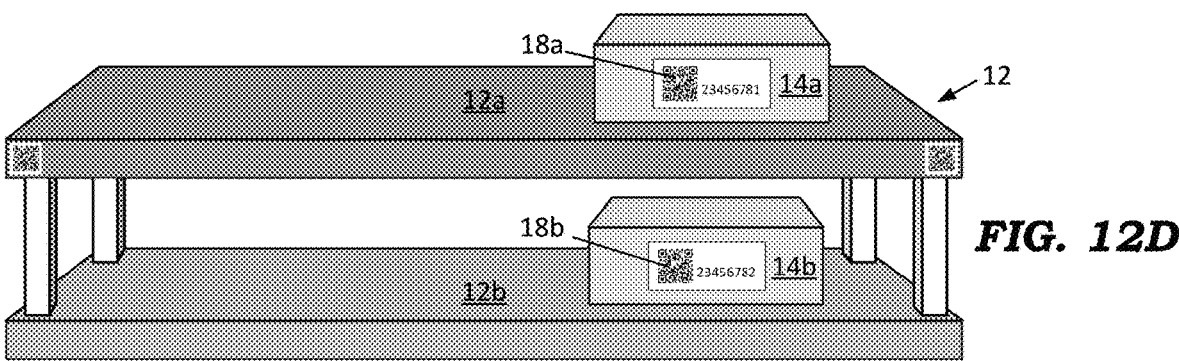
Figure 14:
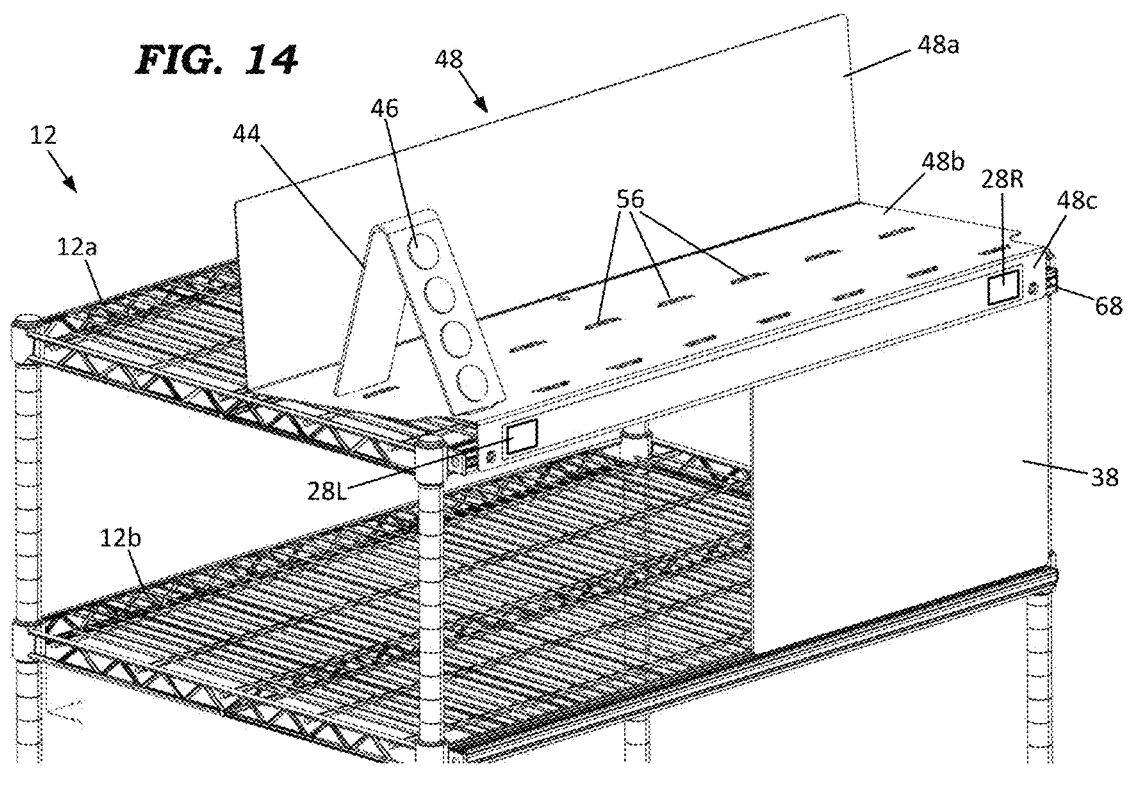
Figure 15:
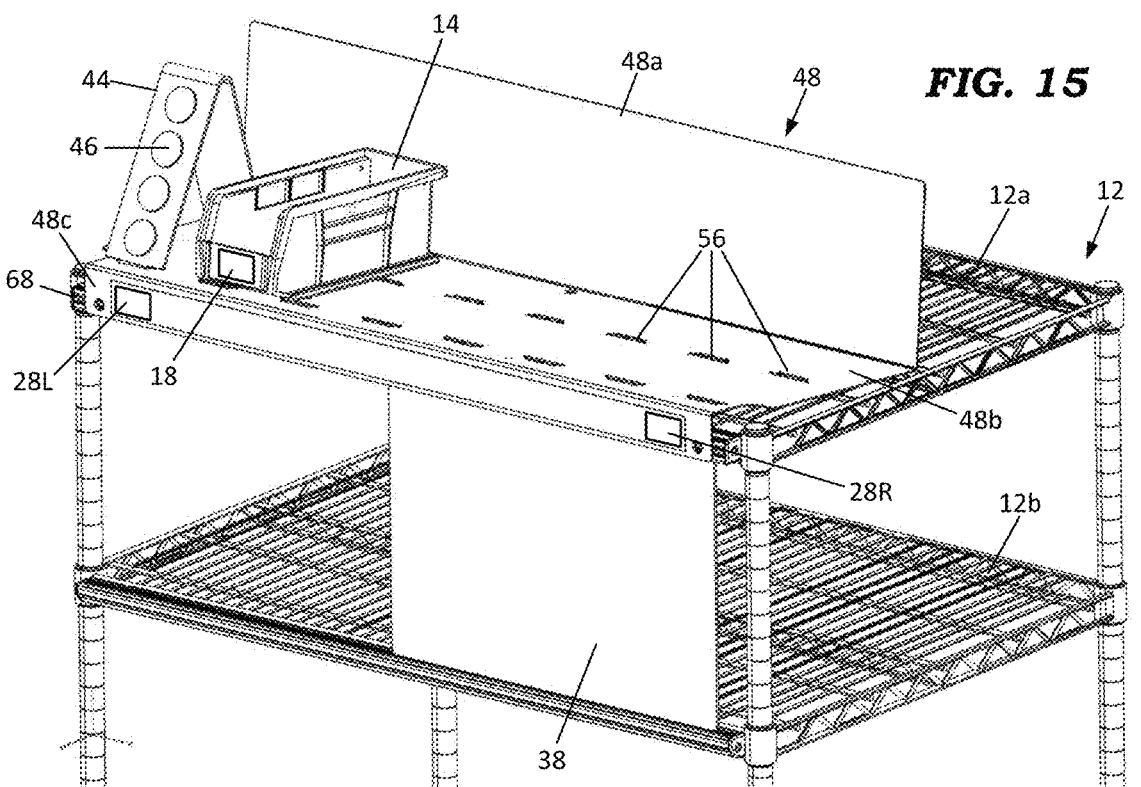

The "two-bin problem" refers to a sequence of events as depicted in FIGS. 12A-12D. The sequence begins with two bins 14a and 14b on a lower shelf 12b of a shelving unit 12 as shown in FIG. 12A, with both having a state of OnShelf in the state machine. Personnel have been instructed to use all the items in bin 14a before using any items in bin 14b. Once all the items in bin 14a have been used, the empty bin is placed on the top shelf 12a as shown in FIG. 12B. The state of bin 14a remains OnShelf until its code 18a is captured in an image generated by the camera 16, at which point the state of bin 14a changes to OnTop. After a programmed period of time has elapsed, the state of bin 14a transitions from OnTop to OnOrder and a replenishment signal is generated. This causes an order to be placed for the appropriate items to refill bin 14a. Some amount of time passes after placement of the order before the ordered items are delivered to the inventory location where shelving unit 12 is located and personnel restock the bin. After bin 14a was placed on the top shelf 12a, personnel began using items from bin 14b. At some point in time before bin 14a is restocked, bin 14b is emptied and placed on the top shelf 12a, as shown in FIG. 12C. The state of bin 14b remains OnShelf until its code 18b is captured in an image generated by the camera 16, at which point the state of bin 14b changes to OnTop. Before camera 16 captures an image showing bin 14b on the top shelf, the items ordered to refile bin 14a arrive in the inventory room, and personnel mistakenly put those items in bin 14b instead of bin 14a, and place bin 14b back onto the lower shelf 12b as shown in FIG. 12D. The state of bin 14a remains OnOrder until its code 18b is constantly not present in a captured image generated by the camera 16 as described above, at which point the state of bin 14a changes to OnShelf. Since bin 14b was never captured in an image showing bin 14b on the top shelf, the state of bin 14b remains OnShelf and a replenishment signal is not generated for bin 14b. At this point, because bin 14a is still on the top shelf 12a, its state is still OnOrder although the system reorder status is "filled." In this situation, the system has basically degraded into a one-bin Kanban system, and human intervention will be needed to resolve the problem.

Figure 8:
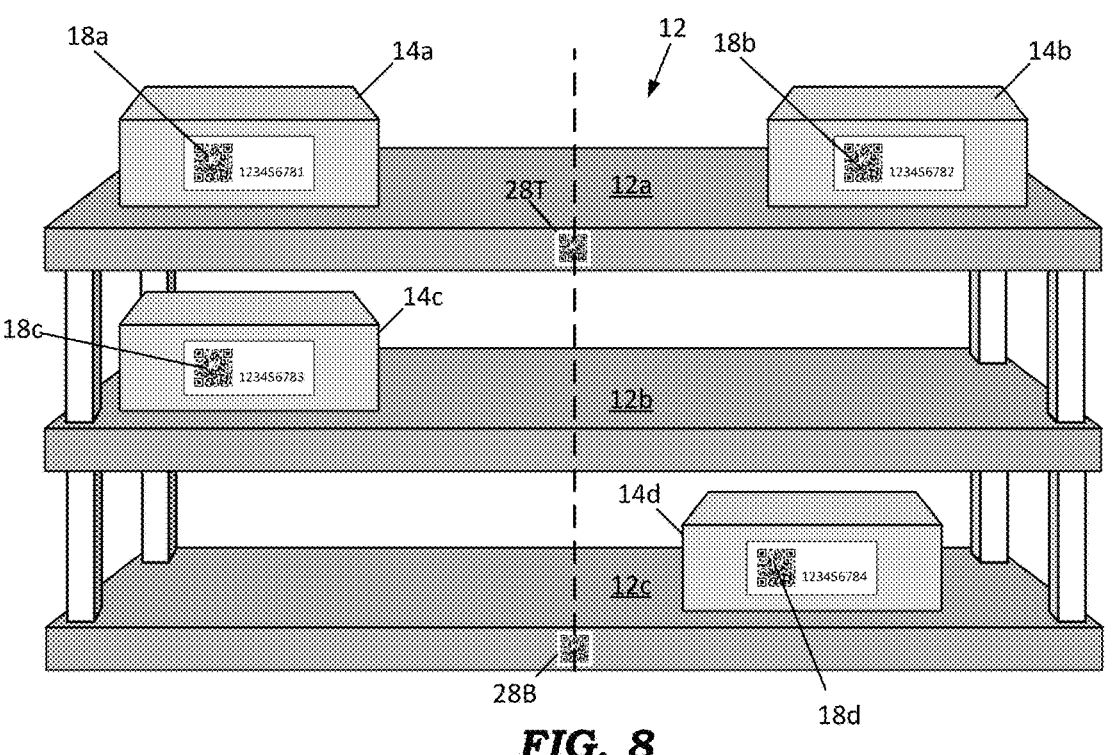
FIG. 8 depicts a physical configuration of an inventory management system according to an alternative embodiment of the invention.

In some embodiments, it may be desirable to determine whether an optically encoded object, such as a bin, is disposed to the left or right of a vertical boundary line. In one such embodiment depicted in FIG. 8, vertically-aligned shelf codes are provided, such as a top shelf code 28T disposed on the top shelf 12a and a bottom shelf code 28B disposed on the bottom shelf 12c. The image processing software 22 identifies the top and bottom shelf codes 28T and 28B and assigns a reference x-y coordinate location to each identified code based on x-y coordinates of image pixels associated with each of the top shelf codes 28T and 28B. For example, coordinates x=24, y=0 may be assigned to the top shelf code 28T and coordinates x=24, y=−24 may be assigned to the bottom shelf code 28B, wherein the vertical boundary line passing through the two codes is defined by the equation x=24. Distinct inventory areas could be defined to occupy portions of the shelves either to the right (x>24) or to the left (x<24) of the vertical boundary line.

Those of ordinary skill in the art will appreciate that various embodiments of the system may employ other positions of shelf codes to also construct diagonal boundary lines, and combinations of horizontal, vertical and diagonal boundary lines. It should also be appreciated that such boundary lines need not be straight but could be curved in various and complex orientations to accomplish desired Kanban inventory replenishment functions. A boundary line may also be defined by an equation of a rectangle, triangle, circle, or any other closed shape, wherein decisions are made regarding inventory replenishment based on whether an optically encoded structure is disposed inside or outside the closed boundary shape.

It will be appreciated that the image processing of optical codes is prone to errors. A code may be recognized in one image but not in the next. The m and n thresholds in the above example are a mechanism to compensate for the error in the image processing. Image processing errors could be caused by external environmental items (e.g., lighting level changes in the inventory room, humidity changes, etc.) or by external transitive items (e.g., a tall person standing in front of a shelving unit, a worker temporarily placing a ladder in front of a shelving unit, etc.).

Another embodiment of the invention, as depicted in FIGS. 10A-10C and 11, is useful for goods that do not fit in bins, so that they need to be stored directly on a shelf. This embodiment includes an inventory shelving unit 12 having multiple shelves 12a, 12b, and 12c. The shelf 12b provides a first designated inventory storage area 12b1 in which a first supply of goods 30 is stored and a second designated inventory storage area 12b2 in which a second supply of goods 30 is stored (step 100 in FIG. 11). A slider panel 38 is operable to slide between a first position and a second position (step 102). When moved to the first position (step 110), the slider panel 38 allows access to the first supply of goods 30 in the first inventory storage area 12b1 and blocks access to the second supply of goods 30 in the second inventory storage area 12b2. When moved to the second position (step 110), the slider panel 38 allows access to the second supply of goods 30 in the second inventory storage area 12b2 and blocks access to the first supply of goods 30 in the first inventory storage area 12b1.

Figure 10A:
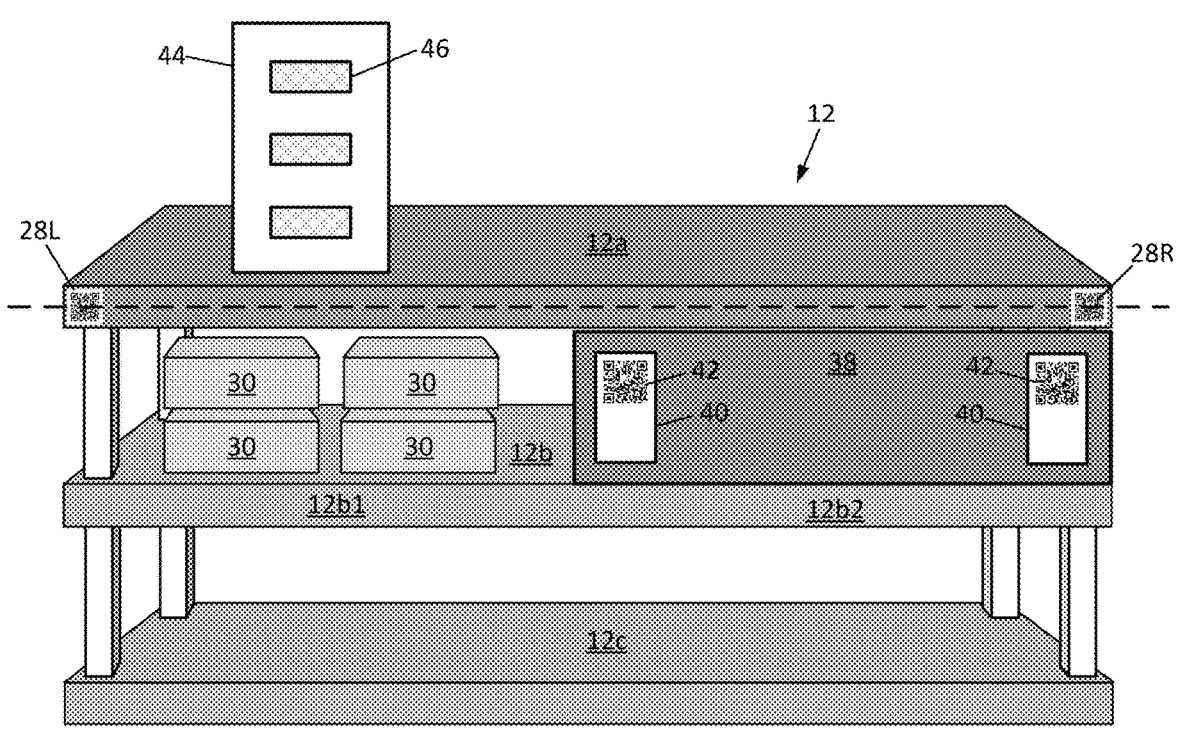
FIGS. 10A, 10B and 10C depict a physical configuration of an inventory management system according to another embodiment of the invention.

Removably attached to the slider panel 38 are first and second moveable structures 40 (step 104). In a preferred embodiment, the moveable structures 40 are labels that are attached to the slider panel 38 by an attachment mechanism 46, such as a hook-and-loop mechanism, a magnetic mechanism, or a snap mechanism. Printed on or otherwise applied to the movable structures are optical codes 42. In a preferred embodiment, the optical codes 42 encode a unique identification number that identifies the particular type of goods 30 in the associative inventory database 24 that resides on the cloud-based server 26 (FIGS. 3 and 4). Initially, when the first and second supplies of goods 30 are both present in the first and second inventory storage areas 12b1 and 12b2, the moveable structures 40 containing the optical codes 42 are both attached to the slider panel 38, as shown in FIG. 10A (step 106).

Figure 10B:
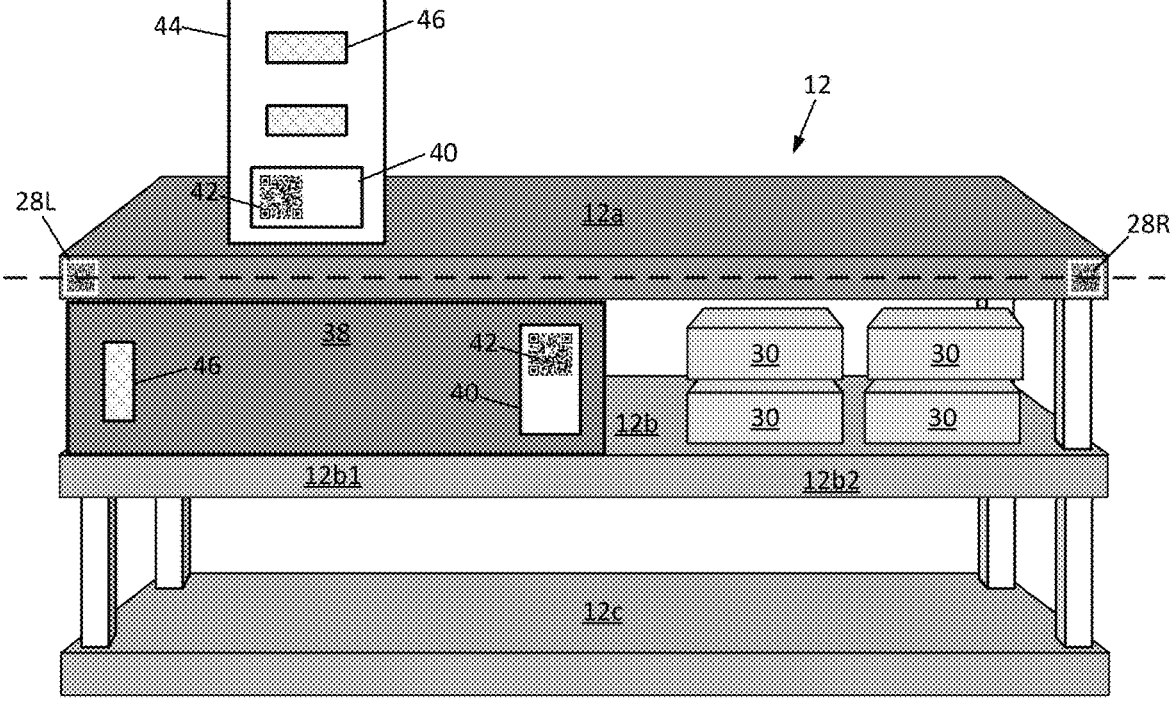
Figure 10C:
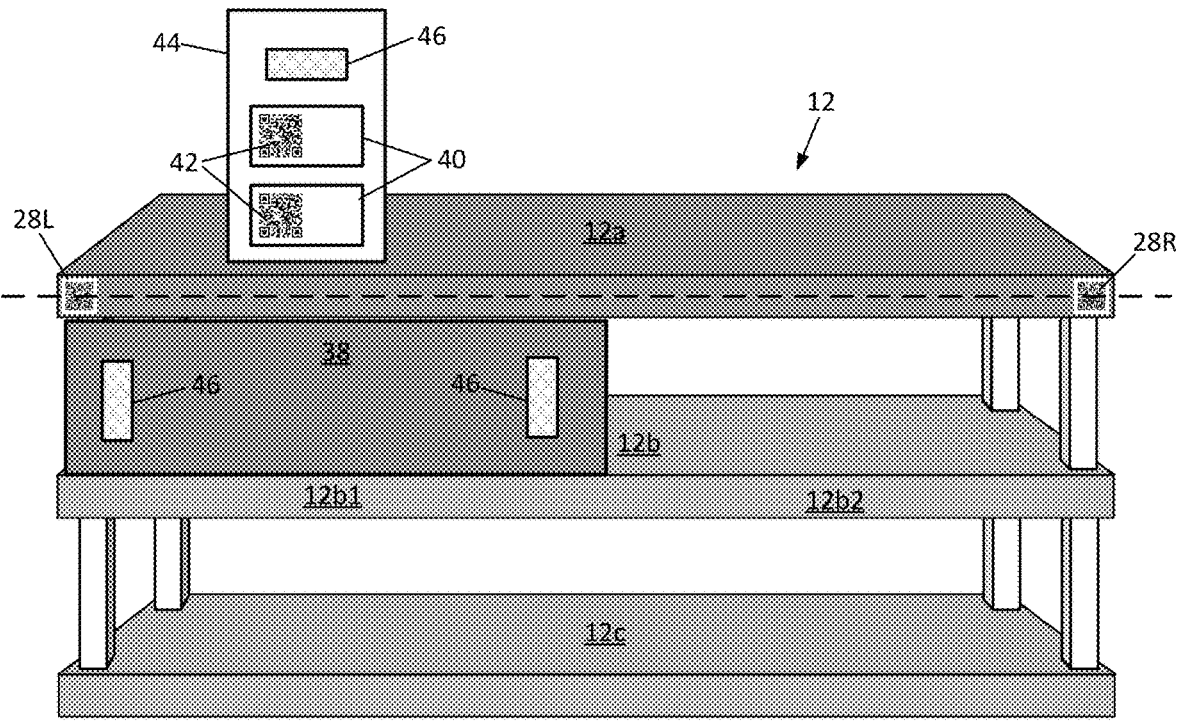

In this embodiment, the top shelf 12a of the shelving unit 12 is the replenishment signaling area (step 108), in which the placement of either of the moveable structures 40 containing the optical codes 42 causes generation of a replenishment signal. Thus, when the first supply of goods 30 in the first inventory storage area 12b1 on the shelf 12b has been depleted, a user detaches one of the moveable structures 40 from the slider panel 38 and places it on the top shelf 12a, as shown in FIG. 10B (step 112). The slider panel 38 is then moved to provide access to the second inventory storage area 12b2 on the shelf 12b (step 110). When the second supply of goods 30 in the second inventory storage area 12b2 has been depleted, the user detaches the remaining moveable structure 40 from the slider panel 38 and places it on the top shelf 12a, as shown in FIG. 10C (step 112).

To ensure that the optical codes 42 on the moveable structures 40 are clearly visible and decodable in the images generated by the camera 16, the moveable structures 40 are preferably attached to the front surface of a vertical card holder structure 44 on the top shelf 12a. For example, the card holder structure 44 may be similar to the bookend structure 32 described previously. The card holder structure 44 may be permanently attached to the top shelf 12a or it may be detachable. In a preferred embodiment, the card holder structure 44 includes at least two attachment mechanisms 46 for removably attaching at least two of the moveable structures 40 thereto.

The operation of the camera 16 and the software that determines the boundary line of the replenishment signaling area, determines the spatial relationship between the boundary line and the optical codes 42, and generates replenishment notifications (steps 114-128 in FIG. 11) is substantially the same for this embodiment as was described above for other embodiments.

Top Shelf Structure for Receiving Bins.

Some preferred embodiments include a structure disposed on the top shelf 12a of the shelving unit 12 for receiving empty bins. In the embodiment depicted in FIGS. 13-17 and 18A-18C, the top shelf structure 48 comprises a rear panel 48a, a middle panel 48b, and a front panel 48c. Preferably, the panels 48a-48c are integrally formed as one piece of molded thermoplastic, although the structure 48 could also be formed from metal sheet or wire mesh.

Figures 18A, 18B, 18C:
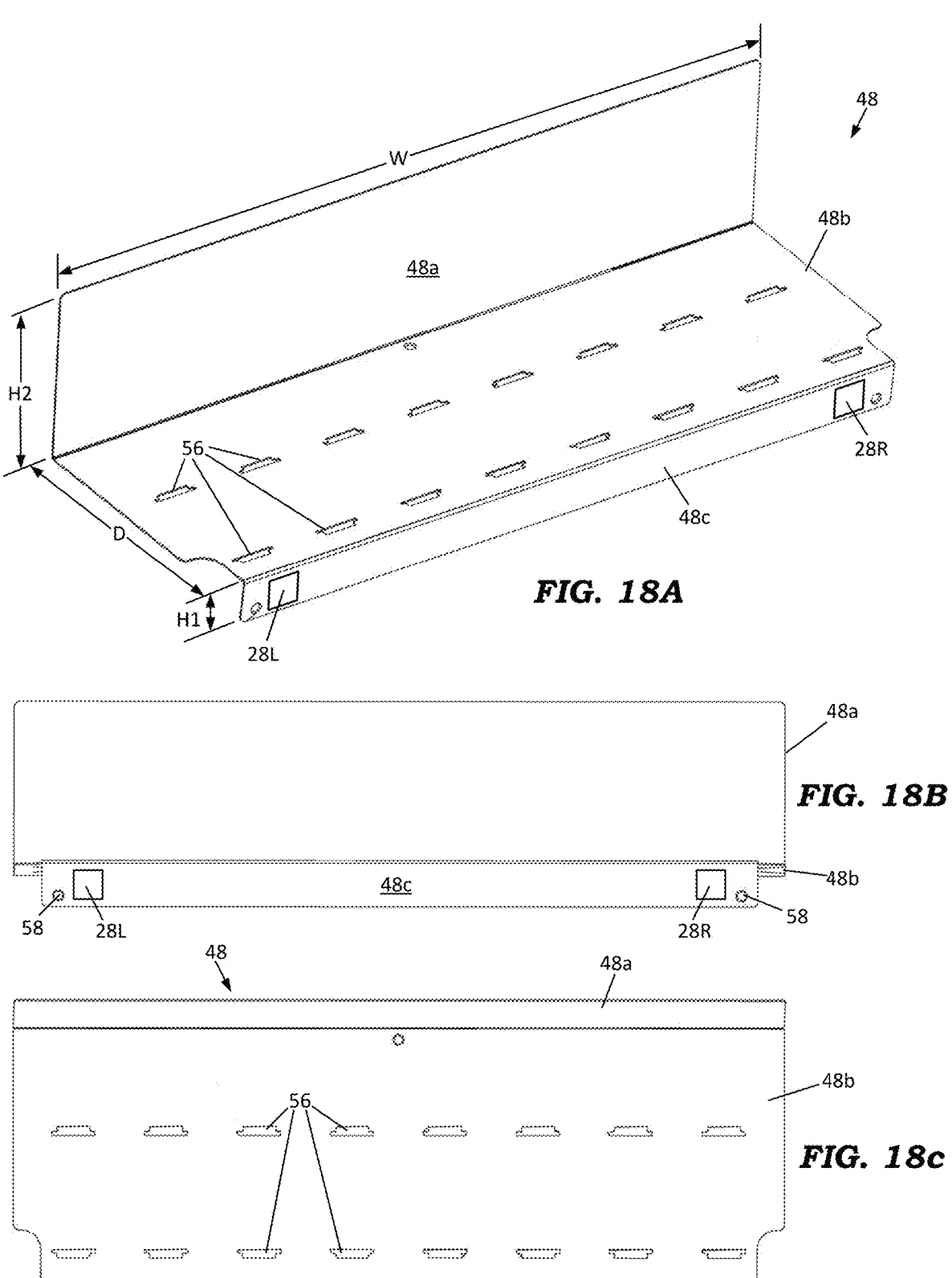
FIGS. 18A-18C depict a bin receiving structure for a top shelf of an inventory management system according to an embodiment of the invention.
Figure 19:
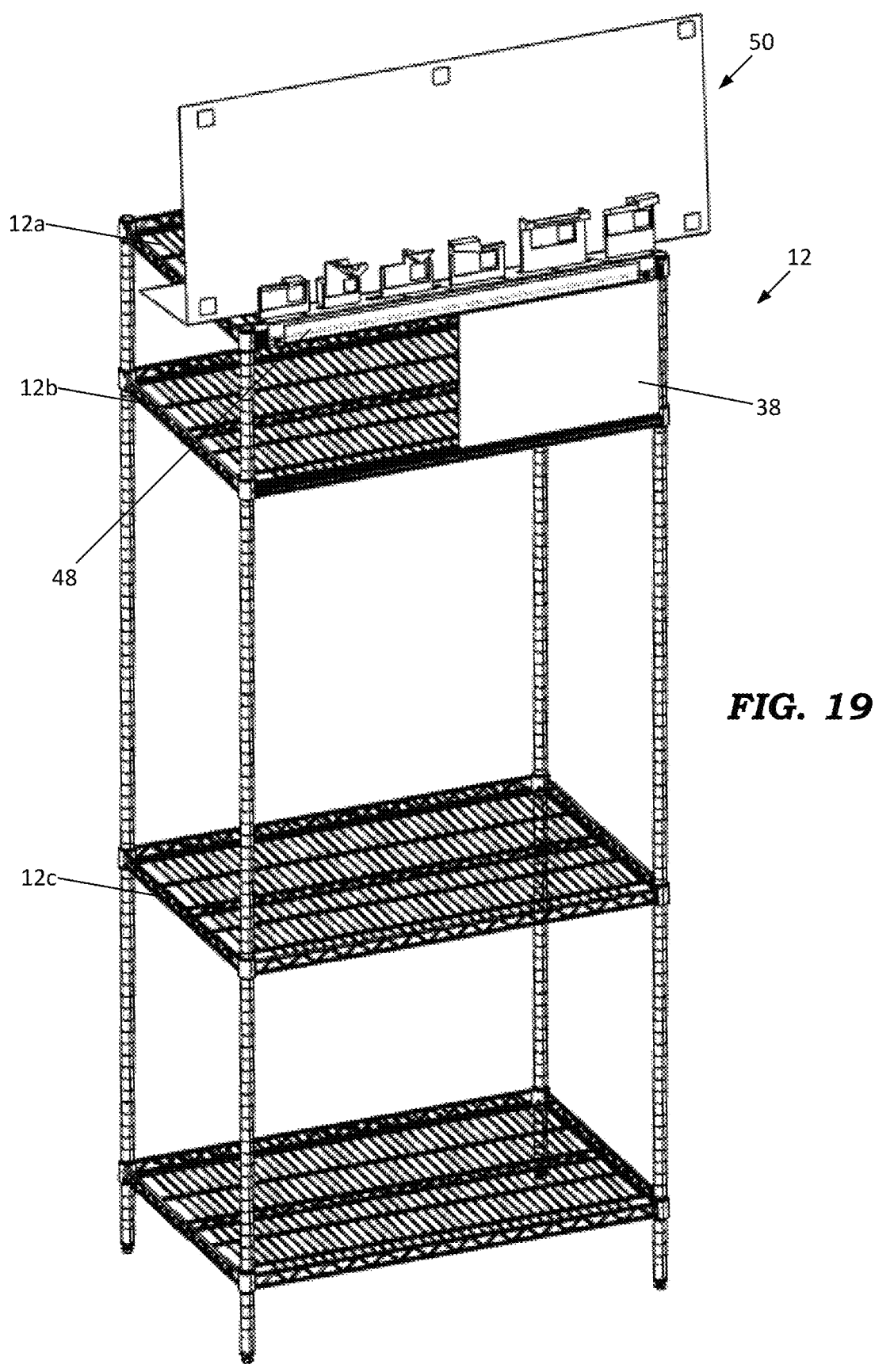
FIGS. 19-22 depict an inventory management system that includes a challenge board on its top shelf according to an embodiment of the invention.
Figures 20, 21:
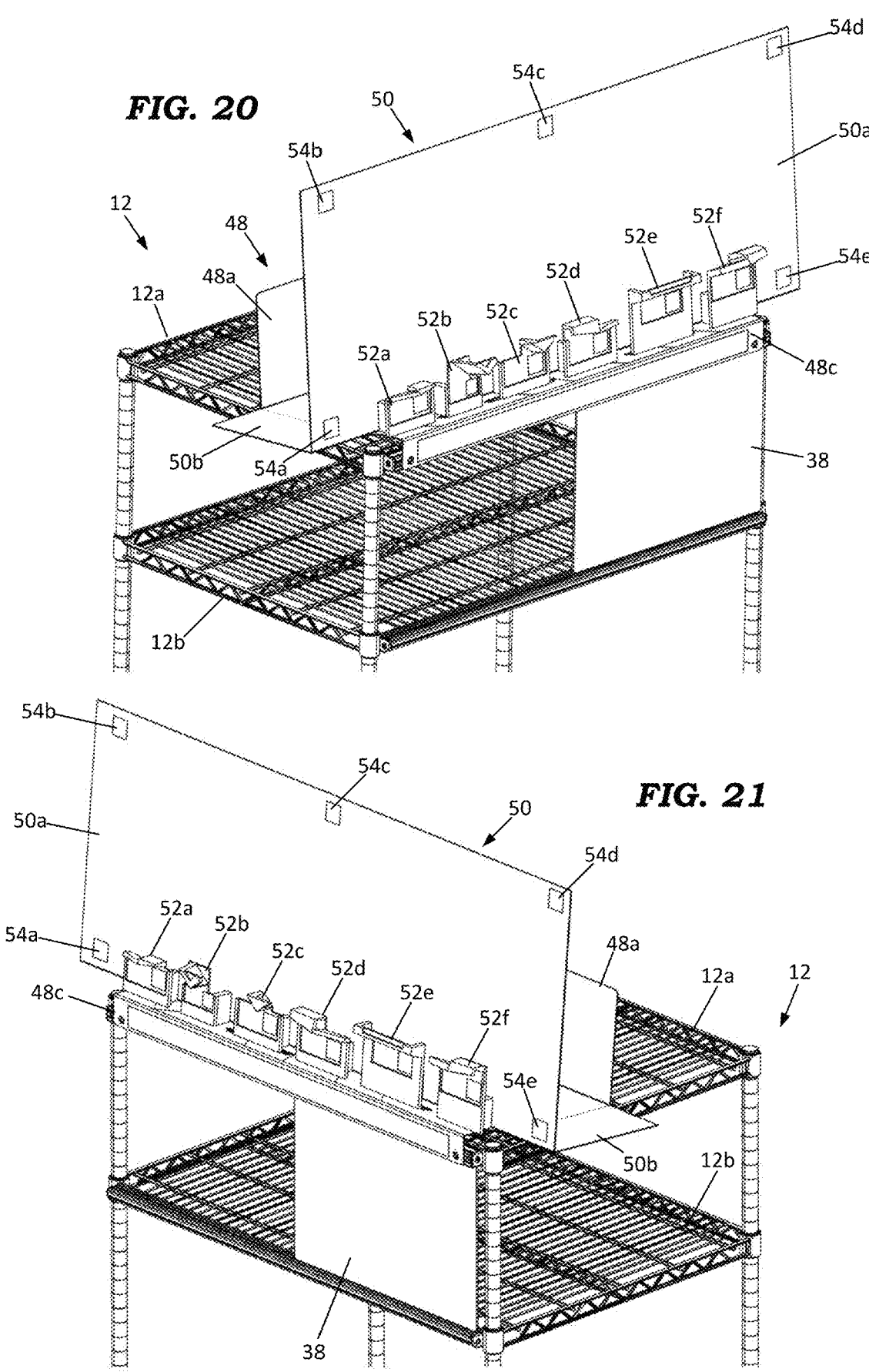
Figure 22:
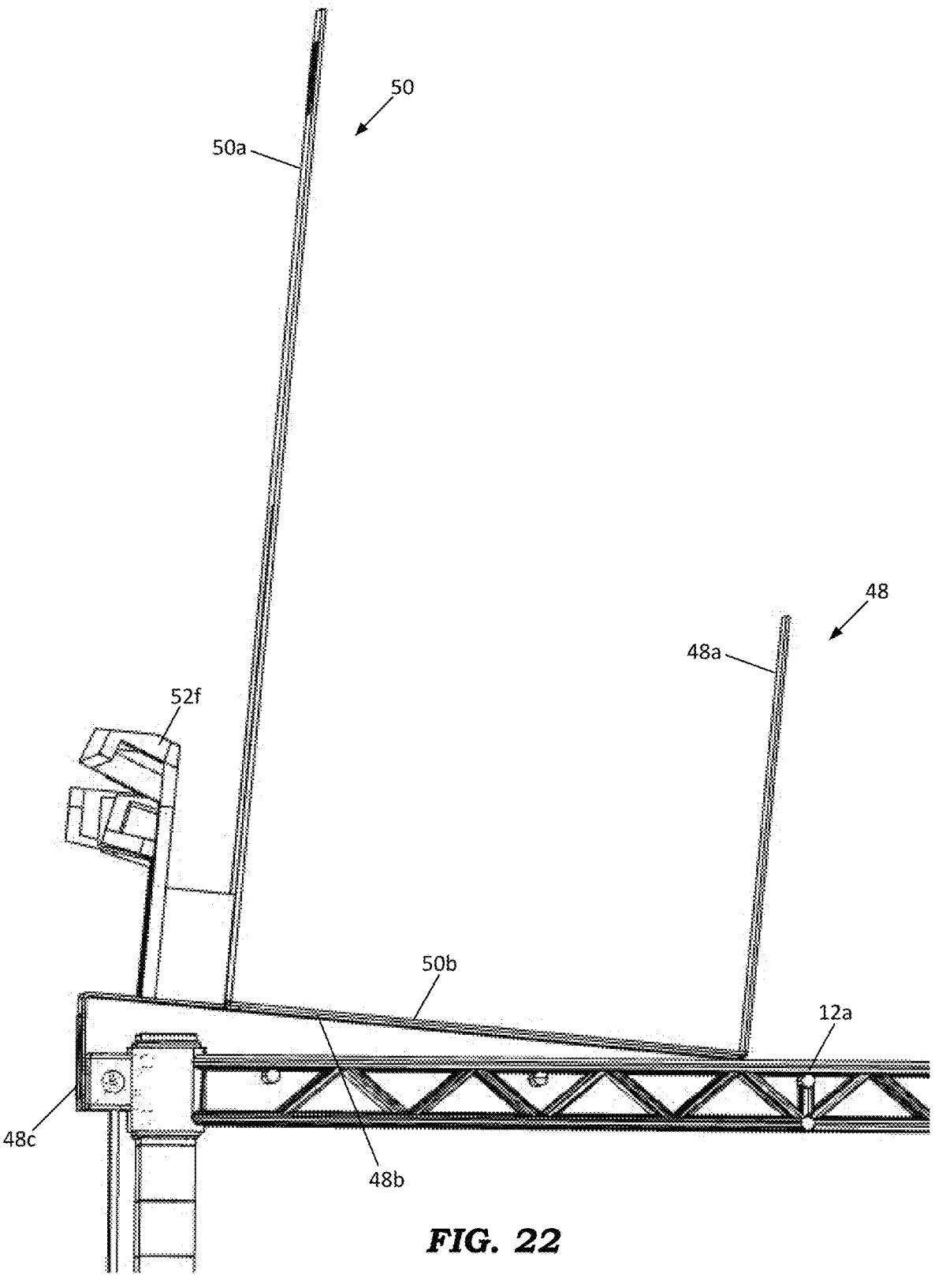

With reference to FIG. 18A, one preferred embodiment of the top shelf structure 48 has the following dimensions in inches: width (W)=35.25, height (H1)=2.05, height (H2) =7.92, and depth (D)=11.85.

Figure 16:
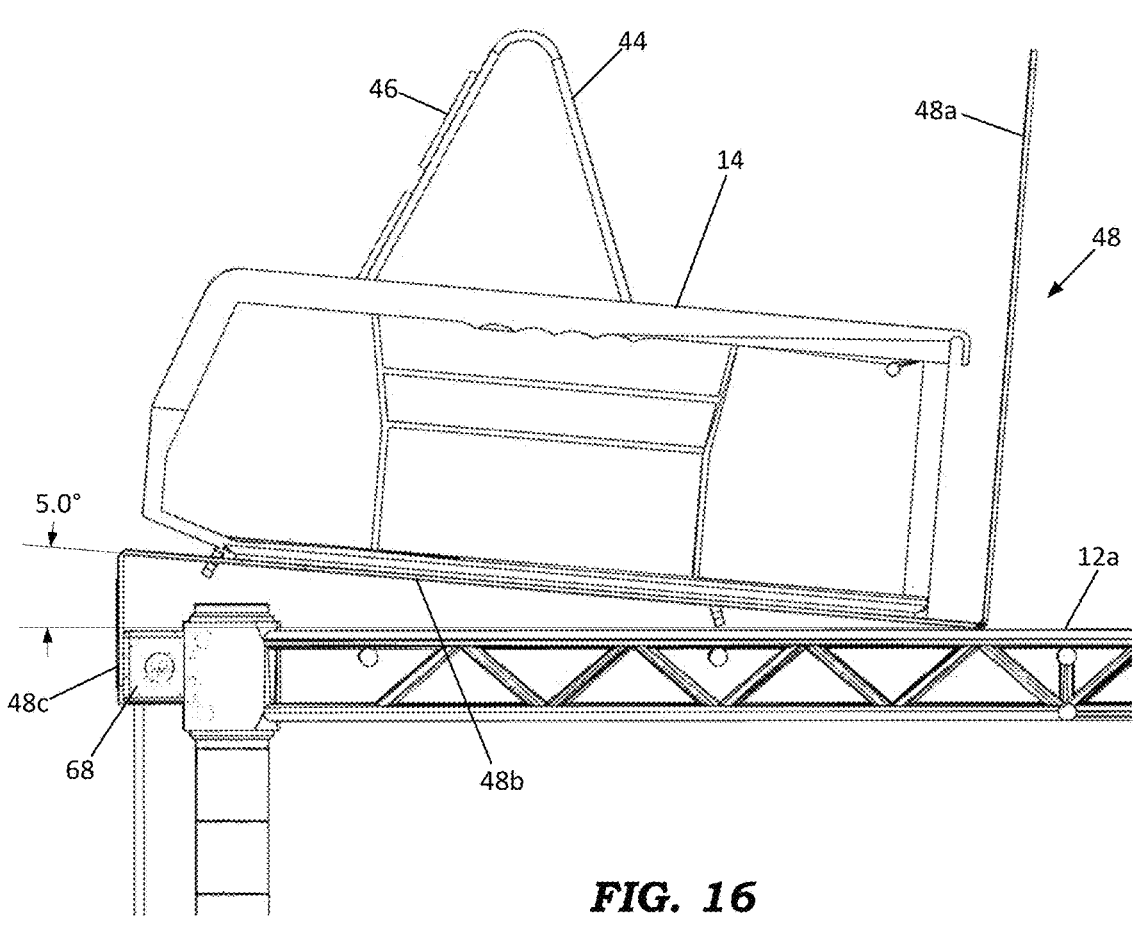
Figure 17:
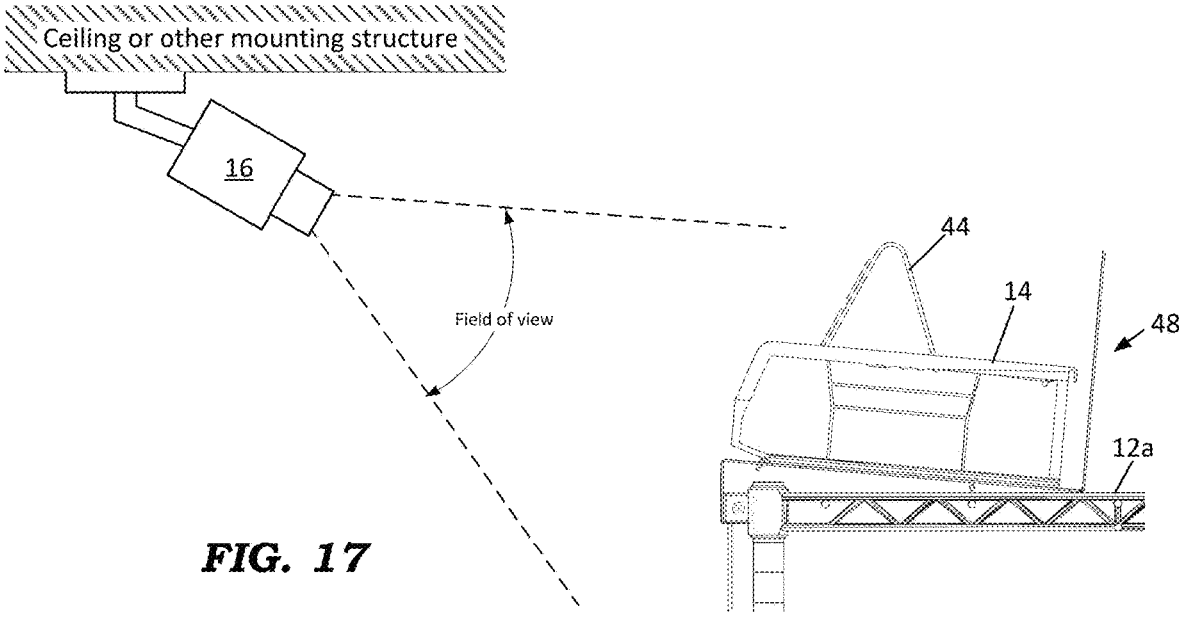

The structure 48 is configured such that the rear edge of the middle panel 48b rests on the uppermost surface of the top shelf 12a, and the front panel 48c is attached to the front edge of the top shelf 12a. As shown in FIG. 16, the middle panel 48b is supported at an angle of about 5 degrees with respect to the uppermost surface of the top shelf 12a. As shown in FIG. 17, due to the upward tilt of the middle panel 48b, when a bin 14 is placed on top of the middle panel 48b, the bin's forward surface is tilted upward to better align with the field of view of the camera 16 mounted above and to the front of the shelving unit 12. The depth of the middle panel 48b measured from front to rear is about the same as the length of the bin 14. When the bin 14 is placed on the structure 48 with the bin's rear surface abutted against the rear panel 48a, the bin's front surface will be disposed near the front edge of the top shelf 12a. The rear panel 48a acts as a backstop for bins placed on the structure 48, and the depth of the middle panel 48b prevents a situation in which a rear bin is hidden behind a front bin.

Thus, it will be appreciated that the upward tilt and depth of the middle panel 48b combined with the backstop function provided by the rear panel 48a makes it more likely that an optical code attached to the front surface of a bin 14 will be within the field of view of the camera 16. This enhances the overall readability of optical codes 18 on bins 14 placed on the top shelf structure 48, and decreases the likelihood that such optical codes will not be detected.

In preferred embodiments, the top shelf structure 48 includes means for attaching a vertical code holder 44. The code holder 44 includes two or more attachment mechanisms 46 for removably attaching at least two of the moveable structures 40 thereto. In the embodiment of FIGS. 13-17, the code holder 44 is shaped like an inverted V and is made of plastic or metal. The code holder 44 preferably has tabs on the bottom of its legs that are removably received in slots 56 in the middle panel 48*b* of the top shelf structure 48. The purpose of the code holder 44 and the moveable structures 40 is the same as that of other such structures described herein. The attachment mechanisms 46 may be hook-and-loop mechanisms, magnetic mechanisms, or snap mechanisms.

A preferred embodiment of the top shelf structure 48 includes the left and right top shelf codes 28L and 28R attached thereto instead of being attached directly to the top shelf 12*a*. The left and right top shelf codes 28L and 28R of this embodiment perform the same functions as of those described elsewhere herein.

In some embodiments, the top shelf codes 28L and 28R may be used to confirm the camera 16 is working properly, and to generate alerts if problems are detected. For example, if (1) the field of view of the camera is properly oriented, (2) there are no obstructions between the camera and the shelving unit, and (3) the camera is in communication with the processor, then the image processing software running on the processor should detect both of the top shelf codes 28L and 28R in the image generated by the camera. In a preferred embodiment, if neither or only one of the top shelf codes 28L and 28R is detected in the image, an error alert is generated and transmitted to the appropriate personnel. Some embodiments may optionally include a third top shelf code centrally disposed between the top shelf codes 28L and 28R. This increases the likelihood that at least two top shelf codes will be detected by the image processing software.

To attach the top shelf structure 48 to the top shelf 12*a*, preferred embodiments include a pair of apertures 58 passing through the front panel 48*c* near each end thereof, as shown in FIG. 18B. The apertures 58 are operable to receive fasteners that engage a T-slot channel structure 68 (such as 80/20 channel) on the front edge of the top shelf 12*a* disposed behind the front panel 48*c*. In some embodiments, multiple pairs of apertures 58 are provided at each end at multiple vertical spacings. This provides a way to selectively adjust the tilt angle of the middle panel 48*b* with respect to the upper surface of the top shelf 12*a*.

Challenge Board.

As noted previously, an imaging-based Kanban system may not properly trigger a replenishment signal if the optical codes on the empty bins on the top shelf are not sufficiently detectable in the camera's images of the top shelf. For example, the angle of the field of view of the camera may not be properly aligned with the angle of the bin, or the bins may be arranged such that an optical code on one bin is hidden by another bin. This may be due to bins being stacked on top of each other, or one bin being placed in front of another. Other problems may be independent of bin placement, such as a failure to properly center the camera's field of view on the top shelf, or a failure to properly set the zoom or focus of the camera. Improper lighting and improper cropping of captured images may also lead to failures to detect optical codes.

To alleviate such problems, a preferred embodiment includes a structure for determining whether the camera(s) 16 are oriented properly with respect to the top shelf 12*a* of the shelving unit 12 and have sufficient lighting to accurately capture images of the optical codes 18 disposed on bins placed on the top shelf structure 48. That validation structure, also referred to herein as the challenge board 50, is depicted in FIGS. 19-22 and 23A-23C. The challenge board

50 is used to verify a proper camera setup before actually using the camera 16 in the operation of the inventory system, and periodically thereafter as needed. In a preferred embodiment, the challenge board 50 is generally L-shaped, comprising two rectangular panels 50*a* and 50*b* attached together at a 90 degree angle. The perimeter dimensions of the top panel 50*a* are sized to generally define a minimum desired field of view of the camera 16 when the challenge board 50 is placed on top of the top shelf structure 48. The depth dimension of the bottom panel 50*b* is selected so that the front of the top panel 50*a* will be disposed at the desired position relative to the front panel 48*c* of the top shelf structure 48 when the back edge of the bottom panel 50*b* is abutted against the rear panel 48*a* of the top shelf structure 48. Preferably, the panels 50*a*-50*b* are integrally formed as one piece of molded or 3D-printed thermoplastic, although they could also be formed from metal sheet or wire mesh.

Figures 23A, 23B, 23C:
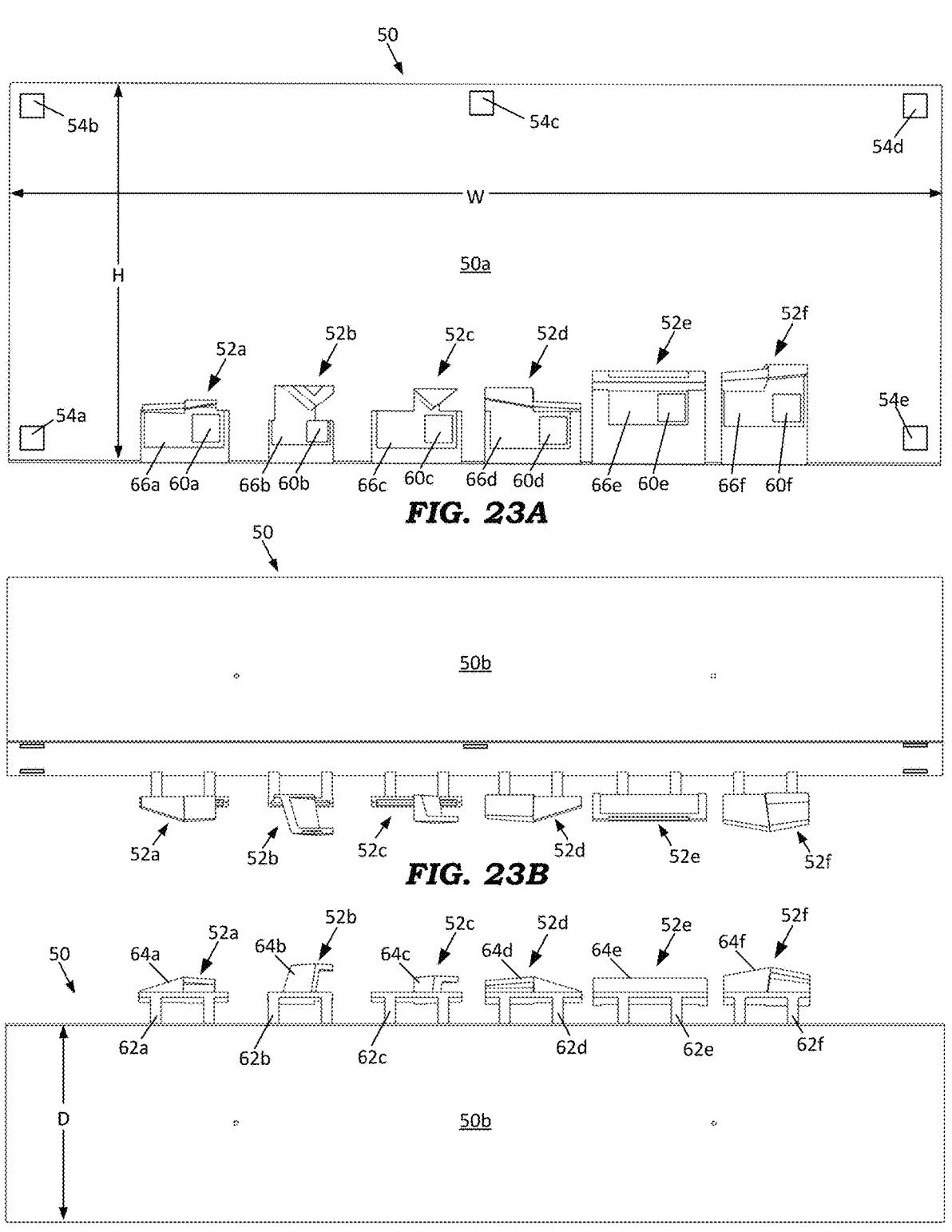
FIGS. 23A, 23B and 23C depict a physical configuration of the challenge board according to an embodiment of the invention.

With reference to FIGS. 23A and 23C, one preferred embodiment of the challenge board 50 has the following dimensions in inches: width (W)=44.05, height (H)=17.81, and depth (D)=9.18.

Attached adjacent to each corner and the top center of the top panel 50*a* are optical perimeter codes 54*a*-54*e*, each of which is encoded with information that indicates its corresponding position on the top panel 50*a* (i.e., bottom left, top left, top center, top right, and bottom right). If the camera 16 is properly positioned with respect to the top shelf 12*a* and the camera's vertical (pitch), horizontal (yaw), and rotation (roll) angles are properly adjusted, then all five of the perimeter codes 54*a*-54*e* should be visible within the camera's field of view. In that case, the image processing software 22 (FIGS. 3 and 4) should detect the position information encoded in all five perimeter codes 54*a*-54*e*. As described in more detail hereinafter, if any of the codes 54*a*-54*e* are not detected, the processor 20 (or the cloud based server 26) generates an alert message indicating that there is a problem with the camera setup. One or more undetected codes 54*a*-54*e* in this circumstance could mean that the camera's field of view is not properly aligned with the challenge board 50. Alternatively—or in addition—it could mean that the camera 16 is out of focus or the lighting in the room is insufficient.

Extending from the front of the top panel 50*a* are a series of protrusions 52*a*-52*f*. Each of the protrusions 52*a*-52*f* includes a rear support structure 62*a*-62*f* extending outward from the top panel 50*a*, a front portion 66*a*-66*f* supported by the rear support structure 62*a*-62*f*, a forward-facing optical code 60*a*-60*f*, and a stacked bin simulation structure 64*a*-64*f*. Each optical code 60*a*-60*f* is encoded with information that indicates its corresponding position on the top panel 50*a*. Each stacked bin simulation structure 64*a*-64*f* represents an upper bin that is stacked on top of a lower bin, wherein the lower bin has the optical code 60*a*-60*f* on its front surface 66*a*-66*f*. The various shapes of the stacked bin simulation structures 64*a*-64*f* simulate bin stacking conditions that may cause one or more of the corresponding optical codes 60*a*-60*f* to be undetected if the camera 16 is not properly positioned and adjusted with respect to the top shelf 12*a*. If any of the codes 60*a*-60*f* are not detected, the processor 20 (or the cloud based server 26) generates an alert message indicating that not all of the codes 60*a*-60*f* were detected. One or more undetected codes 60*a*-60*f* in this circumstance could mean that the camera's field of view is not properly aligned with the challenge board 50, or that the camera 16 is out of focus, or the lighting in the room is insufficient.

Figure 24:
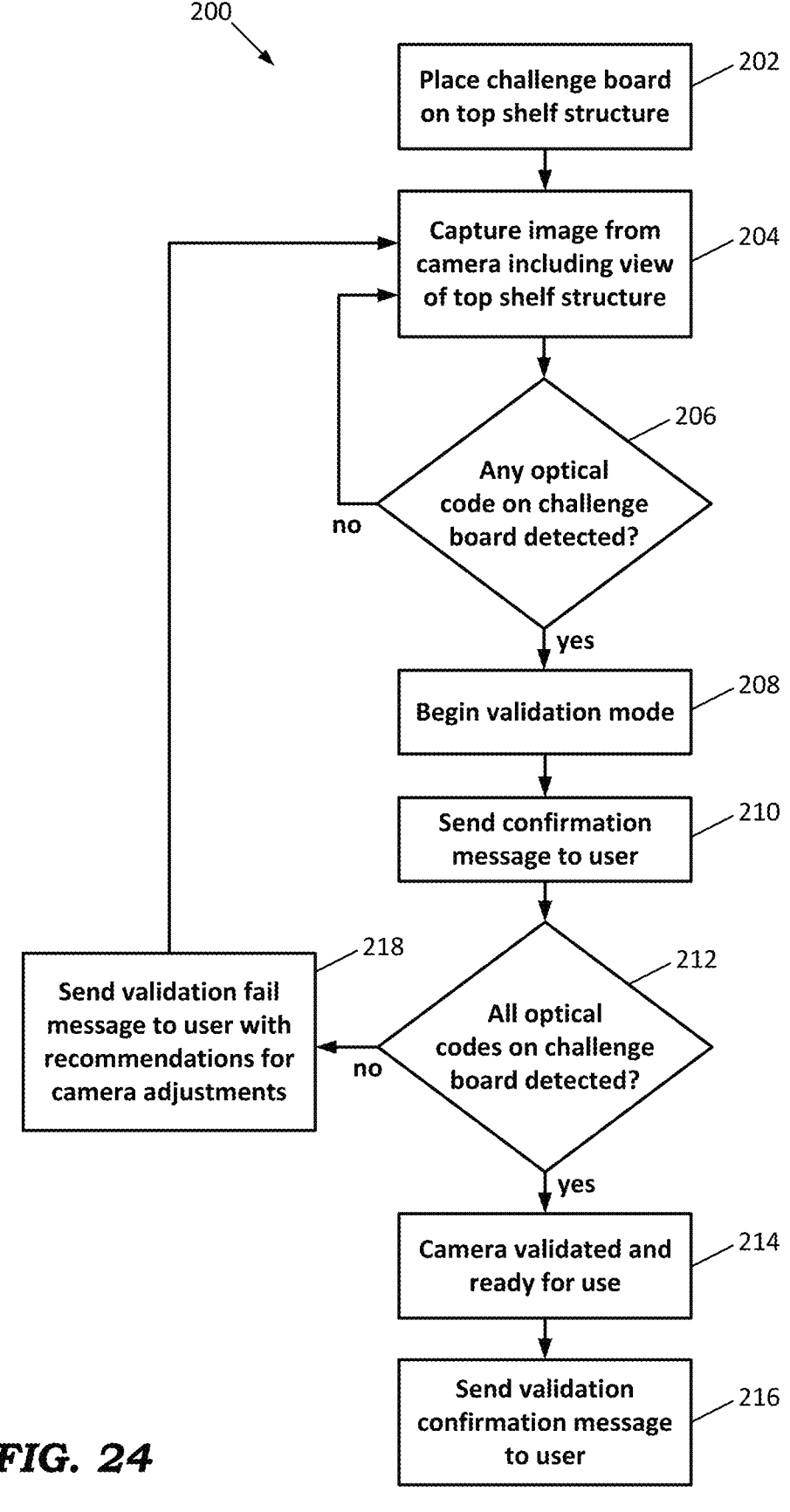
FIG. 24 depicts a flow chart of a computer-implemented method for using the challenge board to validate proper installation and operation of a camera in an inventory management system according to an embodiment of the invention.

FIG. 24 depicts an embodiment of a process 200 for using the challenge board 50 and the system of FIG. 3 (or FIG. 4) to validate a proper camera setup. At some time after a user places the challenge board 50 on top of the top shelf structure 48 (step 202), the camera 16 captures an image (step 204) as part of the imaging-based Kanban inventory monitoring operations described elsewhere herein. The image processing software 22 processes the image to determine whether any optical codes are detected therein (step 206). If any one or more of the optical codes 54a-54e or 60a-60f on the challenge board 50 are detected in the image, the software 22 enters the validation mode (step 208) and sends a confirmation message to the user indicating that the validation mode is active. If none of the optical codes 54a-54e or 60a-60f are detected in the image, the software 22 continues its normal inventory monitoring functions and captures another image (step 204).

When in validation mode, the software 22 determines whether all of the optical codes 54a-54e and 60a-60f are detected in the image (step 212). If so, the camera setup is validated and ready for use in inventory monitoring (step 214), and a confirmation message is sent to the user indicating that the camera setup has been validated (step 216). At this point, the software 22 exits the validation mode and returns to normal inventory monitoring functions. In some embodiments, step 212 of the validation process also includes verification that all of the top shelf codes (e.g., 28L and 28R) are detected in the image.

If any one of the optical codes 54a-54e and 60a-60f (and top shelf codes 28L and 28R in some embodiments) are not detected in the image at step 212, a fail message is sent to the user indicating that the camera setup needs further adjustment before it is ready for use for inventory management functions (step 218). In some embodiments, the fail message may also include specific recommendations for steps the user can take to adjust the camera to resolve the problems that are preventing detection of all of the optical codes on the challenge board 50. These recommendations may be based at least in part on which of the codes are not detected.

For example, there may be a recommendation to increase the angle of the top shelf structure 48 with respect to the top shelf 12a. This may be accomplished by adding hardware to the front of the front edge of the top shelf 12a to increase the height at which the apertures 58 of the top shelf structure 48 attach relative to the top shelf 12a. The increased angle can compensate for a shorter shelving unit 12, higher ceilings, and shorter distances between the shelving unit 12 and the camera 16. The increased angle can allow all optical codes on the challenge board 50 to be detected (step 212). Another way to selectively adjust the tilt angle of the middle panel 48b with respect to the upper surface of the top shelf 12a is to provide multiple pairs of T-slot channel structures 68 at each end of the top shelf 12 at multiple vertical spacings.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for use in a process of monitoring and replenishing an inventory of goods stored in bins disposed on a multi-shelf shelving unit having a top shelf, wherein the process involves placing empty bins on or above the top shelf to signal that replenishment of the inventory is needed, the apparatus comprising:

a front panel configured to attach to a front surface of the top shelf of the multi-shelf shelving unit, the front panel having a top edge disposed above the upper surface of the top shelf, and having a forward surface disposed below the top edge;

one or more optical codes disposed on the forward surface of the front panel;

a middle panel having a front edge attached to the top edge of the front panel, a rear edge configured to rest upon the upper surface of the top shelf, and a planar surface that slopes downward from the front edge to the rear edge, wherein the planar surface is configured to receive the empty bins; and a rear panel extending upward from the rear edge of the middle panel, wherein the rear panel prevents the empty bins from sliding beyond the rear edge of the middle panel; and a plurality of slots distributed across the planar surface of the middle panel.

2. The apparatus of claim 1 wherein the planar surface is disposed at a non-zero angle with respect to the upper surface of the top shelf.

3. The apparatus of claim 2 wherein the non-zero angle is between 3 degrees and 15 degrees.

4. The apparatus of claim 3 wherein the non-zero angle is 5 degrees.

5. The apparatus of claim 1 wherein the one or more optical codes comprise a first optical code disposed adjacent to a first end of the front panel, and a second optical code disposed adjacent to a second end of the front panel opposing the first end.

6. The apparatus of claim 1 wherein the one or more optical codes comprise QR codes or barcodes.

7. The apparatus of claim 1 wherein a distance from the front edge to the rear edge of the middle panel is substantially equivalent to a length dimension of one of the empty bins.

8. The apparatus of claim 1 further comprising a channel structure disposed between the front panel and the front surface of the top shelf that provides for attachment of the front panel to the top shelf.

9. The apparatus of claim 1 further comprising a code holder having a pair of tabs configured to be removably received in a pair of the plurality of slots distributed across the planar surface of the middle panel, the code holder including one or more attachment mechanisms for removably attaching one or more moveable structures on which one or more optical codes are disposed.

10. The apparatus of claim 9 wherein the one or more attachment mechanisms comprise one or more of a hook-and-loop mechanism, a magnetic mechanism, and a snap mechanism.

11. The apparatus of claim 1 further comprising at least one first aperture disposed adjacent to a first end of the front panel and at least one second aperture disposed adjacent to a second end of the front panel, the first and second apertures configured to receive fasteners for attaching the front panel to the top shelf.

12. The apparatus of claim 1 further comprising a challenge board disposed on the middle panel, the challenge board comprising:

a bottom panel disposed on the planar surface of the middle panel, the bottom panel having a rear edge that abuts the rear panel and a front edge spaced apart from the rear edge;

a top panel extending upward from the front edge of the bottom panel;

a plurality of optical perimeter codes attached to a forward surface of the top panel; and a plurality of protrusions extending outward from the top panel, each protrusion configured to simulate a portion of a first bin stacked above a forward surface of a second bin, wherein each protrusion includes an optical bin simulation code disposed on the forward surface.

13. The apparatus of claim 12 wherein each of the plurality of protrusions includes:

a rear support structure attached to and extending outward from the forward surface of the top panel;

a front portion supported by the rear support structure; and a stacked bin simulation structure disposed above the front portion.

14. An apparatus for use in a process of monitoring and replenishing an inventory of goods stored in bins disposed on a multi-shelf shelving unit having a top shelf, wherein the process involves placing empty bins on or above the top shelf to signal that replenishment of the inventory is needed, the apparatus comprising:

a front panel configured to attach to a front surface of the top shelf of the multi-shelf shelving unit, the front panel having a top edge disposed above the upper surface of the top shelf, and having a forward surface disposed below the top edge;

one or more optical codes disposed on the forward surface of the front panel;

a middle panel having a front edge attached to the top edge of the front panel, a rear edge configured to rest upon the upper surface of the top shelf, and a planar surface that slopes downward from the front edge to the rear edge, wherein the planar surface is configured to receive the empty bins;

a rear panel extending upward from the rear edge of the middle panel, wherein the rear panel prevents the empty bins from sliding beyond the rear edge of the middle panel; and a challenge board disposed on the middle panel, the challenge board comprising:

a bottom panel disposed on the planar surface of the middle panel, the bottom panel having a rear edge that abuts the rear panel and a front edge spaced apart from the rear edge;

a top panel extending upward from the front edge of the bottom panel;

a plurality of optical perimeter codes attached to a forward surface of the top panel; and a plurality of protrusions extending outward from the top panel, each protrusion configured to simulate a portion of a first bin stacked above a forward surface of a second bin, wherein each protrusion includes an optical bin simulation code disposed on the forward surface.

15. The apparatus of claim 14 wherein each of the plurality of protrusions includes:

a rear support structure attached to and extending outward from the forward surface of the top panel;

a front portion supported by the rear support structure; and a stacked bin simulation structure disposed above the front portion.

* * * * *